3,558,303
SUBSTITUTED 1,3-DICYCLOALKYLUREAS FOR
CONTROLLING ANNUAL WEED GRASSES
Richard J. Gobeil, Wilmington, Del., assignor to E. I. du
Pont de Nemours and Company, Wilmington, Del.
No Drawing. Continuation-in-part of application Ser. No.
474,175, July 22, 1965. This application Oct. 20, 1967,
Ser. No. 676,719
Int. Cl. A01n 9/20, 9/36, 13/00
U.S. Cl. 71—120                                 6 Claims

ABSTRACT OF THE DISCLOSURE

Controlling annual weed grasses with compounds of the formula:

$$R_1-N(R_2)-\overset{O}{\underset{|}{C}}-N(R_3)-(CH_2)_t-\overset{X}{\underset{|}{R}}-D$$

wherein:

R is cycloalkyl or bicycloalkyl;
$R_1$ is substituted or unsubstituted phenyl, cycloalkyl or bicycloalkyl;
$R_2$ and $R_3$ are hydrogen or $(CH_2E)_zR_4$;
$R_4$ is hydrogen or alkyl;
$t$ is 0 or 1;
E is oxygen or sulfur;
X and D are hydrogen, halogen, methyl or ethyl;
$z$ is less than 6.

A typical compound is 1-methoxymethyl-1-(2-methyl-cyclohexyl)-3-phenylurea useful for controlling annual weed grasses.

CROSS-REFERENCE

This application is a continuation-in-part of my application Ser. No. 474,175, filed July 22, 1965, now abandoned.

SUMMARY OF THE INVENTION

This invention refers to 1-methylol-cycloalkyl-3-phenylureas, methylol substituted 1,3-dicycloalkylureas, 1-methylol-cycloalkenyl-3-phenylureas, methylol substituted 1,3-dicycloalkenylureas and to compositions and methods employing them for controlling the growth of germinating and seedling annual weed grasses.

THE INVENTION

I have discovered compounds of the following formula:

(I)    $R_1-N(R_2)-\overset{O}{\underset{|}{C}}-N(R_3)-(CH_2)_t-\overset{X}{\underset{|}{R}}-D$ wherein:

R is saturated or unsaturated cycloalkyl containing 5 through 8 carbon atoms or saturated bicycloalkyl containing 7 or 8 carbon atoms;

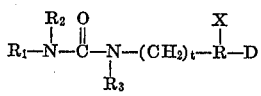

saturated or unsaturated cycloalkyl containing 5 through 8 carbon atoms or saturated bicycloalkyl containing 7 through 8 carbon atoms, monomethyl, dimethyl, monohalo, dihalo and monomethyl-monohalo substituted saturated cycloalkyl containing 5 through 8 carbon atoms or bicycloalkyl containing 7 through 8 carbon atoms with the proviso that R and $R_1$ are different when $t$ is 0;
$R_2$ and $R_3$ are separately hydrogen or $(CH_2E)_zR_4$ with the limitation that no more than one of $R_2$ and $R_3$ is hydrogen and when

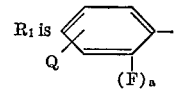

$R_2$ is always hydrogen;
$R_4$ is hydrogen or alkyl containing 1 through 4 carbon atoms;
$a$ and $t$ are each separately 0 or 1;
Q is hydrogen or methyl;
X and D are each separately hydrogen, halogen, methyl or ethyl;
E is oxygen or sulfur;
$z$ is a whole digit less than 6.

Compounds of Formula I control the growth of annual weed grasses without injuring most broadleaf plants and perennial grasses. They are also useful for retarding the growth of desirable perennial grasses without injury.

Excellent control of annual grasses and useful retardation of perennial grasses are obtained from compounds of the formulas:

(II)   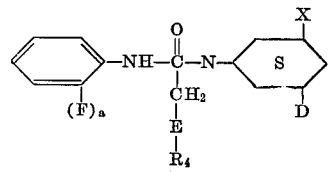

wherein X, D, E, $a$ and $R_4$ have the same meaning as in Formula I.

(III)  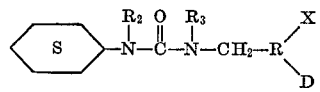

wherein R, $R_2$, $R_3$, X and D have the same meaning as in Formula I.

Outstanding growth retardant effects on annual and perennial grasses are obtained from compounds of the formula:

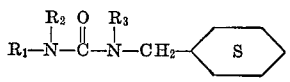

wherein $R_1$ $R_2$ and $R_3$ have the same meaning as in Formula I.

An outstanding feature of the compounds of my invention is their truly selective pre-emergency elimination of several annual seedling grasses from other grasses.

A further outstanding feature of the compounds of Formula I is their ability to retard the growth of established turf grasses, such as Kentucky bluegrass (*Poa pratensis*), Kentucky 31 fescue (*Festuca sp.*) and Bermuda grass (*Cynodon dactylon*).

The selective control of some grasses with safety to seeds and seedlings of other grasses also extends to field crops. Applications pre-emergence to the crop controls such weeds as crabgrass, *Digitaria sp.*; foxtail, *Setaria faberii*; and cheat, *Bromus tectorum*; without significant injury to such cereals as wheat and rice.

In addition to the annual weed grasses some perennial weed plants such as Johnson grass, *Sorghum halepense,* or *almum*; Bermuda grass, *Cynodon dactylon*; nimblewill, *Muhlenbergia schreiberi* and the like are controlled when the perennial is growing from a seed. However, when the perennial plant has developed rhizomes a compound of this invention will only retard its growth.

An annual grass is defined in the Journal of the Weed Society of America, vol. 10, No. 3, July, 1962, as any grass plant that completes its life cycle from seed in one year.

For the purposes of this specification, the annual weed grasses and perennial weed grasses growing from seed such as Bermuda grass, nimblewill and Johnson grass are stated generically to be "seedling weed grasses."

Weeds are defined as any unwanted plant. For the purposes of this specification it is assumed that annual grasses that are commonly cultivated such as ryegrass, wheat, barley and oats are not weeds.

A wide range of plants exhibit satisfactory growth in soils treated both pre-emergence or directed post-emergence with the compounds of this invention. Accordingly, the above weeds are controlled selectively, i.e., without substantial adverse effect on the majority of species in the plant kingdom. Examples of vegetation that are not seriously injured by the compounds used in my invention include the turf grasses described above; cereal crops such as wheat, sorghum, corn and rice and perennial crop grasses such as sugar cane; ornamentals such as marigolds, tulips, arbor vitae, azalea, boxwood, camellia, flowering crab, deutzia, forsythia, Chinese holly, Japanese holly, Tartarian honeysuckle, privet, pyracantha, climbing rose, tea rose, spiraea and other shrubs; trees such as oaks, $Q.$ $alba$, $Q.$ $borealis$ and $Q.$ $velutina$, beech, dogwood, hickory, Norway spruce, black gum, sweet gum, tulip tree, maple and pine; and broadleaf crops such as beets, eggplant, flax, green beans, lima beans, okra, peppers, red beets, safflower, soybeans, spinach, sugar beets, alfalfa, clover, lespedeza, tobacco, peanuts, carrots, tomatoes, squash, cucumber, potatoes and cotton.

Established plants of many plant species particularly those past the three leaf stage are not affected by the compounds used in my invention.

PREPARATION

The methods used to prepare the 1-methylol-1-cycloalkyl-3-phenylureas and 1-methylol - 1 - cycloalkenyl-3-phenylureas of this invention are the following. All symbols have the same meaning as above.

(A)

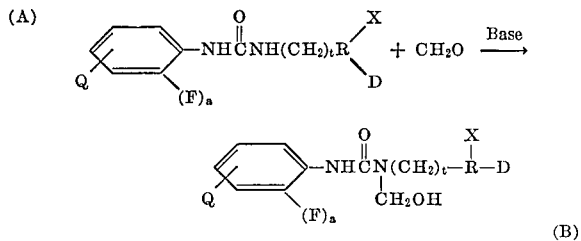

(B)

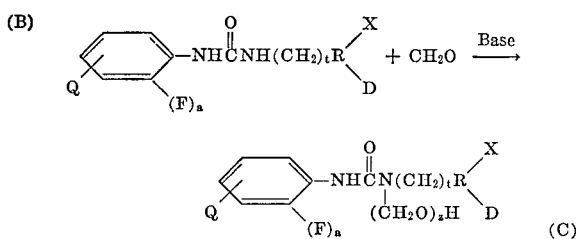

The urea (A) is dissolved in an aqueous dioxane solution and then refluxed in the presence of an inorganic base with an excess of aqueous formaldehyde solution for about 30 to 60 minutes. The work up procedure consisting of washing with acid, unravels the polymeric oxymethylene chain to the desired hydroxymethyl compound (B).

(B)

The urea, base and a large excess of aqueous formaldehyde are refluxed in dioxane for 1 to 2 hours. Elimination of the acid wash step, used in the method above, permits the isolation of compounds having polymeric oxymethylene groups (C).

(C)

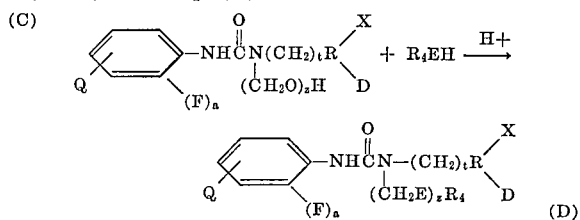

The hydroxymethyl compound is treated with the appropriate alcohol or mercaptan under acidic catalyst at a moderate temperature around 60° C., for several minutes. Evaporation yields the corresponding alkoxymethyl or alkylthiomethyl.

The methylolsubstituted - 1,3 - dicycloalkylureas, 1-cycloalkyl - 3 - cycloalkenylureas and 1,3 - dicycloalkenylureas of this invention are prepared by treating 1,3-dicycloalkylureas with formaldehyde under alkaline conditions.

In general the first step in the reaction sequence of the base catalyzed reaction of formaldehyde and a urea is the formation of the hydroxypoly(methoxy)methyl compound as follows:

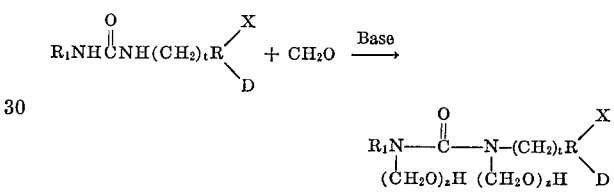

Upon treatment of the above compound with dilute acid an unraveling of the polymeric oxymethylene chain takes place yielding the monomeric hydroxymethyl compound. Only under stronger treatment with acid can the starting urea be obtained.

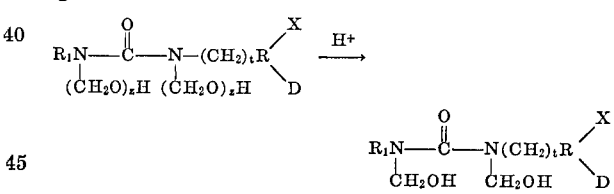

This reversible polymer formulation of formaldehyde is a well-known phenomenon explained in J. F. Walker, "Formaldehyde," second edition, Reinhold Publishing Corp., New York, N.Y., 1953, pp. 293, 294, 295.

In several of the following general examples, it will be noted that mixtures of compounds are obtained. Several reasons account for this fact. For instance, in Example (B) below the two nitrogens have similar basicity; therefore, one obtains a statistical distribution of all three possible hydroxymethyl derivatives, both monohydroxymethyl compounds and a small amount of the bis(hydroxymethyl) derivative. In Example (D) below the indiscriminate cleavage of the hydroxymethyl moieties, under the reaction conditions used along with basicities of the nitrogen leads to the formation of the three possible methoxymethyl or methylthiomethyl compounds; namely, two monomethoxymethyl or monomethylthiomethyl derivatives and the 1,3-bis(methoxythiomethyl) or -(methylthiomethyl) compound. A second factor involved in this situation is the inherent ambiguity of formaldehyde chemistry. This complexity has led W. V. Farrar in J. Applied Chem. 14, 390 (1964) to remark, "Even under standardized conditions, it is often difficult to obtain reproducible results, and the formation of some compound appears to be capricious." With this short background in mind the methods of preparation are now given.

The methods used to prepare 1-methylol-1-cycloalkyl-3-cycloalkylureas, 1-methylol - 1 - cycloalkyl - 3 - cycloalkenylureas, 1-methylol-1,3-dicycloalkenylureas are the following. All symbols have the same meaning as above.

(A) 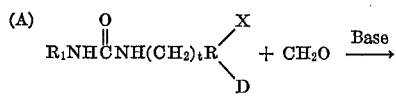

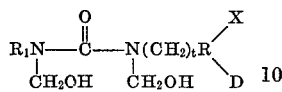

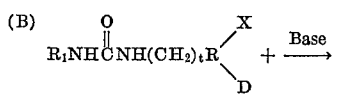

The urea is dissolved in an aqueous dioxane solution and then refluxed, in the presence of an inorganic base, with an excess of aqueous formaldehyde solution for some period of time, for example, thirty minutes to two hours. The high temperature involved allows bis hydroxymethylation to take place.

(B) 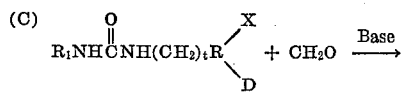

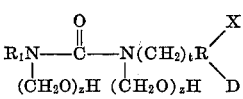

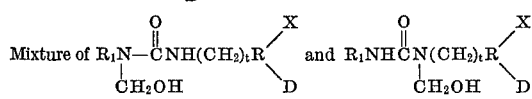

The urea, one equivalent of formaldehyde and the base are again reacted in aqueous dioxane but at a temperature not exceeding 40° C., preferably 25° C., for several hours. These mild conditions and the single equivalent of formaldehyde greatly favor the formation of the monohydroxymethyl derivatives.

(C) 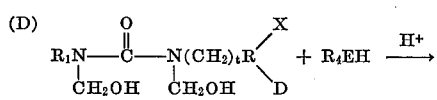

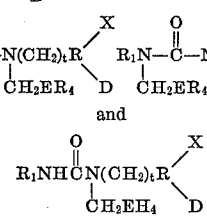

The urea, base and a large excess of aqueous formaldehyde are refluxed, in an aqueous dioxane system, for several hours. Elimination of the acid wash step, used in the previous two examples, allows for the retention of the linear polymeric oxymethylene groups.

(D) 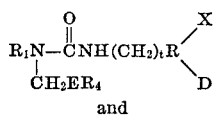

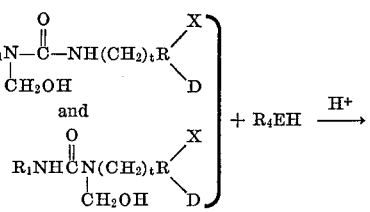

The 1,3-bis(hydroxymethyl) compound is reacted with the appropriate alcohol or mercaptan, under acidic catalyst at a moderate temperature, around 35° C., for several hours. Evaporation yields the crude product as shown above.

Ether formation under the above conditions can be found in U.S. 2,201,927 and pp. 301, 302 in Walker's "Formaldehyde" book.

(E) 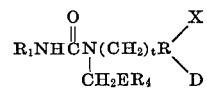

The procedure used in this equation is the same as the procedure taught for (D) above except that the temperature is about 65° C.

The compounds of Formula I are much lower melting than the ureas from which they are derived. In fact, many are liquids and thus offer the possibility of handling and application advantages. For example, 1-(2-methylcyclohexyl)-3-phenylurea found in U.S. Pat. 3,309,192, is a high melting solid (M.P. 131–132.5° C.) whereas 1-(hydroxymethyl)-1-(2-methylcyclohexyl) - 3 - phenylurea, 1-(hydroxymethoxymethyl) - 1 - (2-methylcyclohexyl) - 3-phenylurea and 1-(methoxymethoxymethyl)-1-(2-methylcyclohexyl)-3-phenylurea are liquids.

Also, the compounds of Formula I have greatly increased water solubility which also offers significant advantages for some methods of formulation and application. For example, 1-(2-methylcyclohexyl)-3-phenylurea has a very low solubility in water and would be classed by chemists as insoluble whereas the method compounds of Formula I are moderately soluble in water.

COMPOSITIONS

Compositions of this invention comprise a compound of Formula I together with one or more surface-active agents.

The surface-active agent used in this invention can be a wetting, dispersing or an emulsifying agent which will assist dispersion of the compound. The surface-active agent or surfactant can include such anionic, cationic and non-ionic agents as have heretofore been generally employed in plant control compositions of similar type. Suitable surface-active agents are set forth for example in "Detergents and Emulsifiers Annual" (1964) by John W. McCutcheon, Inc. This book is herein incorporated by reference.

Suitable surface-active agents for use in compositions of the present invention are: polyethylene glycol fatty esters and fatty alkylol amide condensates, alkylaryl sulfonates, fatty alcohol sulfates, dialkyl esters of sodium sulfosuccinate, fatty acid esters of sodium isethionate, polyoxyethylene thioethers and long chain quaternary ammonium chloride compounds.

Surface-active dispersion agents such as sodium lignin sulfonates, low viscosity methyl cellulose, polymerized sodium salts of alkylnaphthalene sulfonic acids are also suitable in the growth retardant compositions of this invention.

Among the more preferred surfactants are the anionic and nonionic type. Among the anionic surface-active agents, preferred ones are alkali metal or amine salts or alkylbenzene sulfonic acids, such as dodecylbenzene sulfonic acid, sodium lauryl sulfate, alkylnaphthalene sulfonates, sodium N-methyl-N-oleoyltaurate, oleic acid ester of sodium isethionate, dioctyl sodium sulfosuccinate, sodium dodecyldiphenyloxide disulfonate. Among the nonionic compounds, preferred members are alkylphenoxy poly(ethyleneoxy)ethanols such as nonylphenol adducts with ethylene oxide; trimethylnonyl polyethylene glycol ethers, polyethylene oxide adducts of fatty and rosin acids, long chain alkylmercaptan adducts with ethylene oxide and polyethylene oxide adducts with sorbitan fatty acid esters.

In general, less than 10% by weight of the surface-active agent will be used in compositions of this invention and ordinarily the amount of surface-active agents will range from 1–5% but can be even less than 1% by weight.

Additional surface-active agents can be added to the above formulation to increase the ratio of surface-active agent: active agent up to as high as 5:1 by weight. Normally, the purpose of adding higher amounts of surfactant is to increase the growth retardant effect of the active compounds. When used at higher rates it is preferred that the surfactant be present in the range of one-fifth to five parts surfactant for each one part of active agent.

Plant growth control compositions of this invention can contain, in addition to the surfactant, finely divided inert diluents such as talcs, natural clays, including attapulgite clay and kaolinite clay, pyrophyllite, diatomaceous earths, synthetic fine silicas, calcium silicate, carbonates, calcium phosphates, sulfur, lime and such flours as walnut shell, wheat, redwood, soybeans and cottonseed. The amount of the finely divided inert solid diluent can vary widely but will generally range from 10 to 98% by weight of the growth control composition. The particle size can vary considerably, but will ordinarily be somewhat under 50 microns in the finished formulation.

Compositions of the compounds of Formula I and inert solid diluent can also be formulated into granules and pellets. In such compositions, the diluent will generally range from 65 to 99% and the active ingredient can range from 1 to 35%. It should be understood that it will not be necessary to include a surfactant in the granular and pelletized compositions.

To prepare granules the active compound can be dissolved in a solvent, and this solution can be sprayed over pre-formed clay granules, expanded vermiculite or the like to distribute the active ingredients over and throughout the granular mass. Such granules can range in particle size of from +60 mesh to +4 mesh, and an active ingredient content of 1 to 6% is preferred. It is also possible to make such granules by mixing the finely divided diluents and finely divided growth retarding compound, for instance by grinding together, and then forming granules by adding water, tumbling and drying the resulting spheres.

Pellets can be prepared by extruding a mixture that comprises a compound of Formula I, pelleting clay diluent and water into strands, cutting these, and drying the product. Pellet size can range from 10 mesh to larger shapes such as ⅜ inch cubes. Pellets preferably contain from 5 to 35% of the compound of Formula I. In addition to the diluents, pelletized and granular compositions can contain additives such as binders, surfactants and the like.

Emulsifiable oils also can be employed as carriers with one or more of the compounds of Formula I. In these plant growth regulant compositions the active ingredient, together with a surface-active agent and an oil, form a liquid which can be conveniently poured and measured. Such compositions can be mixed with water at the point of application to form an emulsion containing the herbicide and the surface-active agent. Such compositions have the advantage that the oil will often act as a foam inhibitor and thus reduce the tendency for large amounts of surfactant to form objectionable foam. The oil used, such as toluene, kerosene, Stoddard solvent, xylene, alkylated naphthalenes, diesel oil and the like should be preferably water immiscible.

It is desirable on occasion to add water soluble cosolvents such as dimethylformamide, dimethylacetamide, dimethyl sulfoxide, N-methylpyrrolidone, methyl isoamylketone and the like. It is usually desirable to choose the oil so that one of two conditions prevail. In one instance the active agent will be soluble in the amounts used in particular formulations and a solution results. In the other instance the active agent will be subtsantially insoluble in the oil carrier, so that the composition consists of finely divided particles dispersed in the surfactant/oil mixture.

In these emulsifiable oil concentrates, the compound of Formula I will be present in amounts ranging from 10 to 35% by weight. Precise concentrations of active agent, of course, will depend on the intended use of the composition. When mixed with water at the point of application, the oil concentrate will be diluted so that in the final formulation the active agent will be present in amounts ranging from 0.25 to 2% by weight.

It is possible to use such oil solutions of compounds of Formula I by extending them with other oils, for example, diesel oil, herbicidal oil, and the like for applications such as railroad rights-of-way.

APPLICATION

The compounds of this invention can be applied directly to the soil as pre-emergence treatments or as post-emergence treatments to plant foliage, or they can be mixed intimately with the soil. A growth retardant application on annual grasses will usually be in the range of ½ to 20 pounds per acre, and will preferably be used at the rate of 1 to 15 pounds per acre.

More specifically, as a pre-emergence application on crop lands, 2 to 8 pounds per acre of a compound used in this invention will retard the growth of crabgrass, barnyard grass, foxtail, millet and Johnson grass and Bermuda grass growing from seed. There is a favorable safety margin on crop plants such as cucumbers, potatoes, flax, squash, lima beans, eggplant, ryegrass, tomatoes, cotton, lespedeza, peppers, soybeans, red beets, alfalfa, green beans, carrots, peanut, okra and the like. The seedling weeds usually germinate and then fail to develop showing symptoms of severe growth retardation. It is particularly surprising to note that the compounds of Formula I will control annual grass weeds such as crabgrass, barnyard grass and foxtail without harming cultivated annual grasses such as ryegrass, wheat and rice.

After an application of four to sixteen pounds of active ingredient per acre on areas where perennial grasses are established and at a time before the weeds appear, barnyard grass, crab grass, millet and foxtail weed growth is severely retarded. The weeds make an appearance above the ground and then fail to develop. There is no injury to established Kentucky bluegrass, bentgrass, creeping red fescue, Kentucky 31 fescue or Bermuda grass growing from rhizomes. However, compounds of Formula I at annual grass retardant rates also temporarily retard these established plants, thus reducing the mowing required to maintain them in a desirable appearance.

After a pre-emergence application of two to eight pounds per acre of active ingredient on areas seeded with perennial grasses at a time before the perennial grasses and weeds have appeared, development of crabgrass, barnyard grass and foxtails is severely retarded. There is no undesirable effect on the development of such perennials as Kentucky bluegrass, bentgrass or creeping red fescue.

As a pre-emergence application on crop lands two to eight pounds per acre of active ingredient will retard markedly the development of crab grass, foxtails, barnyard grass and Johnson grass growing from seed. Seedlings that germinate prior to treatment and have reached the 1 to 2-leaf stage are retarded. There is no perceptible injury to crop plants such as cucumbers, cotton, potatoes, flax, squash, lima beans, egg plant, tomatoes, lespedeza, peppers, soybeans, red beets, alfalfa, green beans, carrots, peanuts, okra and the like.

The compounds of this invention also can be applied admixed with other chemicals which are used in agronomic and horticultural management and are compatible with the compounds of this invention. Such chemicals can be, but are not restricted to, the classes of chemicals commonly known as plant nutrients, fertilizers, insecticides, fungicides, herbicides and nematocides. Typical of the insecticides that can be used are:

1,2,3,4,10,10-hexachloro-6,7-epoxy-1,4,4a,5,6,7,8,8a-octahydro-1,4,5,8-dimethanonaphthalene (Dieldrin), 1-2 pounds per acre 1,2,4,5,6,7,8,8-octachloro-4,7-methano-3a,4,7,7a-tetrahydroindane (Chlordane), 2.5 to 10 pounds per acre 1,1,1-trichloro-2,2-bis(p-methoxyphenyl)ethane (Methoxychlor), 2 to 4 pounds per acre 1,1,1-trichloro-2,2-bis(p-chlorophenyl)ethane (DDT), 10 to 20 pounds per acre and 1-naphthyl-N-methylcarbamate ("Sevin") 2 to 4 pounds per acre.

Fungicides that can be used in conjunction with the compounds of this invention include:

metal salts of ethylene bisdithiocarbamic acid, e.g., sodium, manganese, zinc and iron salts; N-trichloromethylmercapto-4-cyclohexene-1,2-dicarboximide;
phenylmercury acetate;
inorganic mercury salts;
methylmercury dihydroxypropyl mercaptide;
methylmercury acetate;
N-trichloromethylthiophthalimide;
2,3-dichloro-1,4-naphthoquinone;
2,3,5-6-tetrachloro-1,4-benzoquinone;
2,4-dichloro-6-(o-chloroanilino)-s-triazine;
copper A;
metal salts of alkyl and dialkyl dithiocarbamic acid, e.g., Zn, Na, K, Fe, Mn, Ni;
zinc pyridinethione;;
S-(1-oxido-2-pyridyl)siothiuronium chloride;
tetrachloroisophthalonitrile;
tetramethylthiuram disulfide;
hydroxymercurichlorophenol and mixtures of these last two, and methylmercury dicyandiamide.

When present in compositions of this invention the above-described fungicides will be present at the rate of .02 to 10 parts by weight based on the weight of the compound of Formula I present in the composition.

The control of annual weed grasses with compound of Formula I often can be advantageously accomplished together with conventional herbicides in situations where the annual weed grasses are growing with weeds controlled by the second herbicide.

Illustrative of herbicides that can be used in conjunction with the compounds of this invention in sprays and granular formulations to take weeds out of desirable plants are the following:

The amount of second herbicide set forth in the left column is in addition to the heretofore indicated dosage of compounds of Formula I.

The above can be in the form of salts or nonvolatile ester formulations. Also contact herbicides can be included, such as cacodylic acid, potassium cyanate, dinitrosec-butyl phenol, 1,1'-ethylene-2,2'-dipyridylium dibromide (diquat) and 1,1'-dimethyl-4,4'-bipyridylium dichloride (paraquat).

Fertilizers commonly called plant nutrients also can be applied together with the compounds used in this invention. The plant nutrients include the commonly used compounds of nitrogen, phosphorus, and potassium, i.e., ammonium sulfate, ammonium nitrate, urea, methylene ureas, low molecular weight urea-formaldehyde polymers, sodium nitrate, anhydrous ammonia, aqueous ammonical solutions of urea or ammonium nitrate, aqueous solutions of urea or ammonium nitrate, ammonium phosphates, superphosphates, triple superphosphates, phosphoric acid and the potassium salts such as the chloride, sulfate and nitrate. The plant nutrients are applied individually or in a mixture with each other as so-called "complete mixtures" of N—P—K which can also contain one or more of the "trace element" plant nutrients; i.e., manganese, zinc, iron, boron, magnesium, etc.

It is understood that the compounds and compositions of this invention are applied to the "locus" of the grass. By "locus" is meant the plant itself when visible above the ground and when the plant is not visible, the immediate area of soil where the grass is developing.

The following additional examples, in which all percents unless otherwise indicated are by weight, are provided to more clearly explain this invention.

EXAMPLE 1

1-hydroxymethyl-1-(2-methylcyclohexyl)-3-phenylurea

A mixture consisting of 10 parts by weight of 1-phenyl-3-(2-methylcyclohexyl)urea, 2 parts by weight of barium hydroxide octahydrate, 150 parts by weight of 37% aqueous formaldehyde solution and 150 parts by weight of dioxane is refluxed for 30 minutes. To the cooled mixture is added 150 parts by weight of water. The mixture is then filtered. The filtrate is extracted three times with 200 parts by weight of methylene chloride. The organic extracts are combined and washed in turn with 100 parts by weight of water, 100 parts by weight of 0.5% aqueous hydrochloric acid solution and finally by 100 parts by weight of water. The organic extracts are dried and evaporated to yield a colorless oil which is essentially pure 1-hydroxymethyl-1-(2-methylcyclohexyl)-3-phenylurea.

| Lbs./Acre | Herbicide | Desirable Plants |
| --- | --- | --- |
| 1-3 | 2,4-dichlorophenoxyacetic acid | Sugar cane and roadside and lawn turf grasses. |
| 0.3-1 | 2,4,5-trichlorophenoxy acetic acid | Roadside and lawn turf grasses. |
| 0.5-1.5 | 2,4,5-trichlorophenoxy-propionic acid | Do. |
| 2-4 | 3-amino-2,5-dichlorobenzoic acid | Soybeans. |
| 1-4 | 2,4-bis(isopropylamino-6-methylmercapto-s-triazine | Soybeans, cotton and sugar cane. |
| 1-4 | 1-n-butyl-3-(3,4-dichlorophenyl)-1-methylurea | Ornamentals and lawn turf grasses. |
| 1-3 | 2-chloro-4,6-bis(ethylamino)-s-triazin | Ornamentals. |
| 1-4 | 2-chloro-4-ethylamino-6-isopropylamino-s-triazine | Sugar cane and pineapples. |
| 1-4 | 3-(p-chlorophenyl)-1,1-dimethylurea | Do. |
| 0.5-2 | 4-(2,4-dichlorophenoxy)-butyric acid | Alfalfa and other legumes. |
| 0.5-2 | 2-methyl-4-chlorophenoxybutyric acid | Do. |
| 1-4 | 3-(3,4-dichlorophenyl)-1,1-dimethylurea | Sugar cane, pineapples, grass seed crops and alfalfa. |
| 1-4 | N-(3,4-dichlorophenyl)-methacrylamide | Cotton. |
| 1-4 | 3-(3,4-dichlorophenyl)-1-methoxy-1-methylurea | Soybeans. |
| 1-4 | 1,2-dihydropyridazine-3,6-dione | Roadside turf grasses. |
| 5-15 | O-(2,4-dichlorophenyl)-O-methyl isoproylphosphoramidothioate | Roadside and lawn turf grasses. |
| 1-4 | 2-ethylamino-4-isopropylamino-6-methylmercpto-s-triazin | Sugar cane. |
| 2-4 | N,N-dimethyl-a,a-diphenylacetamide | Tobacco and tomatoes. |
| 1-3 | Sodium 2,4-dichlorophenoxyethylsulfate | Soybeans. |
| 1-3 | Octyl dodecyl ammonium salts of methyl arosnate | Turf. |
| 1-3 | Disodium methylarsonate | Turf and cotton. |
| 1-5 | Dimethyl ester of tetrachloroterephthalic acid | Turf. |
| 2-6 | 1-(p-chlorophenoxyphenyl)-3,3-dimethylurea | Soybean, cotton, dry beans. |

*Analysis.*—Calc'd for $C_{15}H_{22}N_2O_2$ (percent): C, 69.0; H, 8.2; N, 10.7. Found (percent): C, 69.33; H, 8.24; N, 10.17.

| | Percent |
|---|---|
| 1-hydroxymethyl-1-(2-methylcyclohexyl)-3-phenylurea | 50 |
| Dioctylsodium sulfosuccinate | 1 |
| Attapulgite clay | 48 |
| Sodium lignin sulfonate | 1 |

The wettable powder is distributed over the surface of No. 4 vermiculite by tumbling together. To make the combination more adherent the mix is sprayed with a mixture of ethylene glycol and water. The final ratio of ingredients is as follows:

| | Percent |
|---|---|
| 50% active wettable powder | 4 |
| No. 4 vermiculite | 86 |
| Ethylene glycol | 5 |
| Water | 5 |

In a modification of the above formulation the ethylene glycol is replaced by a mixture of the sodium sulfates of mixed long chain alcohol fatty acid esters and diethylene glycol acetate in a ratio between 1:10 and 10:1 by weight.

The granular formulation described above possesses utility as a pre-emergence treatment for controlling the growth of crabgrass in an area containing established perennial grasses such as Kentucky bluegrass or creeping red fescue. The material is applied with a granule spreader at the rate of 6 pounds of active ingredient per acre prior to the germination of crabgrass. Such excellent control of crabgrass is obtained that it presents no competition to the established perennials. The established perennial species grow normally.

This formulation is used also for the retardation of crabgrass in crops belonging to the bean family. A pre-emergence application of 3 to 4 pounds of active ingredient per acre essentially stops the growth of crabgrass shortly after it emerges from the soil. A planting of beans grows normally.

EXAMPLES 2–59

The following products are prepared in the manner of the 1-hydroxymethyl-1-(2-methylcyclohexyl)-3-phenylurea of Example 1 by substituting for the 1-phenyl-3-(2-methylcyclohexyl)urea a like amount by weight of the following ureas.

The products are each formulated and applied in like manner as the product of Example 1 and like results are obtained.

EXAMPLE 60

1-methoxymethyl-1-(2-methylcyclohexyl)-3-phenylurea

A solution consisting of 100 parts by weight of 1-hydroxymethyl-1 - (2 - methylcyclohexyl)-3-phenylurea, one part concentrated hydrochloric acid, 200 parts by weight of chloroform and 500 parts by weight of methanol is refluxed for 10 minutes and then evaporated at 25° C. to yield a colorless oil. The oil consists mainly of 1-methoxymethyl-1-(2-methylcyclohexyl)-3-phenylurea.

| | Urea | Product |
|---|---|---|
| 2 | 1-cyclooctyl-3-phenylurea | 1-hydroxymethyl-1-cyclooctyl-3-phenylurea. |
| 3 | 1-(chlorocyclooctyl)-3-phenylurea | 1-hydroxymethyl-1-(chlorocyclooctyl)-3-phenylurea. |
| 4 | 1-(dibromocyclooctyl)-3-phenylurea | 1-hydroxymethyl-1-(dibromocyclooctyl)-3-phenylurea. |
| 5 | 1-(methylcyclooctyl)-3-phenylurea | 1-hydroxymethyl-1-(methylcyclooctyl)-3-phenylurea. |
| 6 | 1-(dimethylcyclooctyl)-3-phenylurea | 1-hydroxymethyl-1-(dimethylcyclooctyl)-3-phenylurea. |
| 7 | 1-(fluorocyclooctyl)-3-phenylurea | 1-hydroxymethyl-1-(fluorocyclooctyl)-3-phenylurea. |
| 8 | 1-(dichlorocyclooctyl)-3-phenylurea | 1-hydroxymethyl-1-(dichlorocyclooctyl)-3-phenylurea. |
| 9 | 1-cycloheptyl-3-phenylurea | 1-hydroxymethyl-1-cycloheptyl-3-phenylurea. |
| 10 | 1-(chlorocycloheptyl)-3-phenylurea | 1-hydroxymethyl-1-(chlorocycloheptyl)-3-phenylurea. |
| 11 | 1-(dichlorocycloheptyl)-3-phenylurea | 1-hydroxymethyl-1-(dichlorocycloheptyl)-3-phenylurea. |
| 12 | 1-(bromocycloheptyl)-3-phenylurea | 1-hydroxymethyl-1-(bromocycloheptyl)-3-phenylurea. |
| 13 | 1-(methylcycloheptyl)-3-phenylurea | 1-hydroxymethyl-1-(methylcycloheptyl)-3-phenylurea. |
| 14 | 1-(2-bromocyclohexyl)-3-phenylurea | 1-hydroxymethyl-1-(2-bromocyclohexyl)-3-phenylurea. |
| 15 | 1-cycloocten-2-yl-3-phenylurea | 1-hydroxymethyl-1-phenyl-3-cycloocten-2-ylurea. |
| 16 | 1-(dichlorocyclohexyl)-3-phenylurea | 1-hydroxymethyl-1-(dichlorocyclohexyl)-3-phenylurea. |
| 17 | 1-(2-iodocyclohexyl)-3-phenylurea | 1-hydroxymethyl-1-(2-iodocyclohexyl)-3-phenylurea. |
| 18 | 1-(2-fluorocyclohexyl)-3-phenylurea | 1-hydroxymethyl-1-(2-fluorocyclohexyl)-3-phenylurea. |
| 19 | 1-(2-chlorocyclohexyl)-3-phenylurea | 1-hydroxymethyl-1-(2-chlorocyclohexyl)-3-phenylurea. |
| 20 | 1-cyclopentyl-3-phenylurea | 1-hydroxymethyl-1-cyclopentyl-3-phenylurea. |
| 21 | 1-(2-methylcyclopentyl)-3-phenylurea | 1-hydroxymethyl-1-(2-methylcyclopentyl)-3-phenylurea. |
| 22 | 1-(chlorocyclopentyl)-3-phenylurea | 1-hydroxymethyl-1-(chlorocyclopentyl)-3-phenylurea. |
| 23 | 1-(dichlorocyclopentyl)-3-phenylurea | 1-hydroxymethyl-1-(dichlorocyclopentyl)-3-phenylurea. |
| 24 | 1-(bromocyclopentyl)-3-phenylurea | 1-hydroxymethyl-1-(bromocyclopentyl)-3-phenylurea. |
| 25 | 1-(2-norbornyl)-3-phenylurea | 1-hydroxymethyl-1-(2-norbornyl)-3-phenylurea. |
| 26 | 1-(3-methyl-2-norbornyl)-3-phenylurea | 1-hydroxymethyl-1-(3-methyl-2-norbornyl)-3-phenylurea. |
| 27 | 1-(1,7-dimethyl-2-norbornyl)-3-phenylurea | 1-hydroxymethyl-1-(1,7-dimethyl-2-norbornyl)-3-phenylurea. |
| 28 | 1-(2-ethylcyclopentyl)-3-phenylurea | 1-hydroxymethyl-1-(2-ethylcyclopentyl)-3-phenylurea. |
| 29 | 1-(3,3-dimethyl-2-norbornyl)-3-phenylurea | 1-hydroxymethyl-1-(3,3-dimethyl-2-norbornyl)-3-phenylurea. |
| 30 | 1-(5,5-dimethyl-2-norbornyl)-3-phenylurea | 1-hydroxymethyl-1-(5,5-dimethyl-2-norbornyl)-3-phenylurea. |
| 31 | 1-(chloronorbornyl)-3-phenylurea | 1-hydroxymethyl-1-(chloronorbornyl)-3-phenylurea. |
| 32 | 1-(dichloronorbornyl)-3-phenylurea | 1-hydroxymethyl-1-(dichloronorbornyl)-3-phenylurea. |
| 33 | 1-cyclohexyl-3-m-tolylurea | 1-hydroxymethyl-1-cyclohexyl-3-m-tolylurea. |
| 34 | 1-cyclooctyl-3-m-tolylurea | 1-hydroxymethyl-1-cyclooctyl-3-m-tolylurea. |
| 35 | 1-cyclopentyl-3-m-tolylurea | 1-hydroxymethyl-1-cyclopentyl-3-m-tolylurea. |
| 36 | 1-(2-methylcyclohexyl)-3-m-tolylurea | 1-hydroxymethyl-1-(2-methylcyclohexyl)-3-m-tolylurea. |
| 37 | 1-(3-methylcyclohexyl)-3-m-tolylurea | 1-hydroxymethyl-1-(3-methylcyclohexyl)-3-m-tolylurea. |
| 38 | 1-cycloheptyl-3-m-tolylurea | 1-hydroxymethyl-1-cycloheptyl-3-m-tolylurea. |
| 39 | 1-2-chlorocyclohexyl)-3-m-tolylurea | 1-hydroxymethyl-1-(2-chlorocyclohexyl)-3-m-tolylurea. |
| 40 | 1-(3-methylcyclohexyl)-3-phenylurea | 1-hydroxymethyl-1-(3-methylcyclohexyl)-3-phenylurea. |
| 41 | 1-(chlorocyclohexylmethyl)-3-phenylurea | 1-hydroxymethyl-1-(chlorocyclohexylmethyl)-3-phenylurea. |
| 42 | 1-cyclohexylmethyl-3-m-tolylurea | 1-hydroxymethyl-1-(cyclohexylmethyl)-3-m-tolylurea. |
| 43 | 1-cyclohexyl-3-o-tolylurea | 1-hydroxymethyl-1-cyclohexyl-3-o-tolylurea. |
| 44 | 1-(1-methylcyclohexyl)-3-phenylurea | 1-hydroxymethyl-1-(1-methylcyclohexyl)-3-phenylurea. |
| 45 | 1-(2-methylcyclohexyl)-3-(2-fluorophenyl)urea | 1-hydroxymethyl-1-(2-methylcyclohexyl)-3-(2-fluorophenyl)urea. |
| 46 | 1-(3-methylcyclohexyl)-3-(2-fluorophenyl)urea | 1-hydroxymethyl-1-(3-methylcyclohexyl)-3-(2-fluorophenyl)urea. |
| 47 | 1-cyclohexyl-3-(o-fluorophenyl)urea | 1-hydroxymethyl-1-cyclohexyl-3-(o-fluorophenyl)urea. |
| 48 | 1-cycloheptyl-3-(o-fluorophenyl)urea | 1-hydroxymethyl-1-cycloheptyl-3-(o-fluorophenyl)urea. |
| 49 | 1-cyclooctyl-3-(o-fluorophenyl)urea | 1-hydroxymethyl-1-cyclooctyl-3-(o-fluorophenyl)urea. |
| 50 | 1-norbornyl-3-(o-fluorophenyl)urea | 1-hydroxymethyl-1-(norbornyl)-3-(o-fluorophenyl)urea. |
| 51 | 1-(cyclohexylmethyl)-3-(o-fluorophenyl)urea | 1-hydroxymethyl-1-(cyclohexylmethyl)-3-(o-fluorophenyl)urea. |
| 52 | 1-(2,3-dichlorocyclohexyl)-3-(o-fluorophenyl)urea | 1-hydroxymethyl-1-(2,3-dichlorocyclohexyl)-3-(o-fluorophenyl)urea. |
| 53 | 1-(2-ethylcyclohexyl)-3-phenylurea | 1-hydroxymethyl-1-(2-ethylcyclohexyl)-3-phenylurea. |
| 54 | 1-(3-ethylcyclohexyl)-3-(o-fluorophenyl)urea | 1-hydroxymethyl-1-(3-ethylcyclohexyl)-3-(o-fluorophenyl)urea. |
| 55 | 1-(2-chlorocyclohexyl)-3-p-tolylurea | 1-hydroxymethyl-1-(2-chlorocyclohexyl)-3-p-tolylurea. |
| 56 | 1-(dimethylcyclooctyl)-3-(o-fluorophenyl)urea | 1-hydroxymethyl-1-(dimethylcyclooctyl)-3-(o-fluorophenyl)urea. |
| 57 | 1-(dichlorocyclooctyl)-3-(o-fluorophenyl)urea | 1-hydroxymethyl-1-(dichlorocyclooctyl)-3-(o-fluorophenyl)urea. |
| 58 | 1-(dichlorocyclooctyl)-3-m-tolylurea | 1-hydroxymethyl-1-(dichlorocyclooctyl)-3-m-tolylurea. |
| 59 | 1-(1-methylcyclohexyl)-3-m-tolylurea | 1-hydroxymethyl-1-(1-methylcyclohexyl)-3-m-tolylurea. |

*Analysis.*—Calc'd for $C_{16}H_{24}N_2O_2$ (percent): C, 69.6; H, 8.7; N, 10.0. Found (percent): C, 69.2; H, 8.76; N, 9.7.

| | Percent |
|---|---|
| 1-methoxymethyl-1-(2 - methylcyclohexyl)-3-phenylurea | 25.00 |
| Alkylnaphthalene sulfonic acid, Na salt | 1.00 |
| Low viscosity methyl cellulose | 0.25 |
| Attapulgite clay | 73.75 |

The active component is sprayed on the solid components while being tumbled in a blender and the mix is micropulverized until homogeneous.

The formulation described above is applied pre-emergence at the rate of 5 to 8 pounds of active ingredient per acre in 100 gallons of water for the control of growth of crabgrass in areas containing established Kentucky 31 fescue. Excellent retardation of crabgrass is obtained without noticeable damage to the desirable turf grass.

EXAMPLES 61–141

The following products are prepared in the manner of the 1-methoxymethyl-1-(2-methylcyclohexyl)-3- phenylurea of Example 60 by substituting for the 1-hydroxymethyl-1-(2-methylcyclohexyl)-3 - phenylurea and methanol a like amount by weight of the following hydroxyurea and alcohol or mercaptan.

The products are each formulated and applied in like manner to provide like results.

| | Hydroxy Urea | Alcohol | Product |
|---|---|---|---|
| 61 | 1-hydroxymethyl-1-cyclooctyl-3-phenylurea | Methyl alcohol | 1-methoxymethyl-1-cyclooctyl-3-phenylurea. |
| 62 | 1-hydroxymethyl-1-(chlorocyclooctyl)-3-phenylurea | do | 1-methoxymethyl-1-(chlorocyclooctyl)-3-phenylurea. |
| 63 | 1-hydroxymethyl-1-(dibromocyclooctyl)-3-phenylurea | do | 1-methoxymethyl-1-(dibromocyclooctyl)-3-phenylurea. |
| 64 | 1-hydroxymethyl-1-(methylcyclooctyl)-3-phenylurea | do | 1-methoxymethyl-1-(methylcyclooctyl)-3-phenylurea. |
| 65 | 1-hydroxymethyl-1-(dimethylcyclooctyl)-3-phenylurea | Ethyl alcohol | 1-ethoxymethyl-1-(dimethylcyclooctyl)-3-phenylurea. |
| 66 | 1-hydroxymethyl-1-(fluorocyclooctyl)-3-phenylurea | Methyl alcohol | 1-methoxymethyl-1-(fluorocyclooctyl)-3-phenylurea. |
| 67 | 1-hydroxymethyl-1-(dichlorocyclooctyl)-3-phenylurea | n-Propyl alcohol | 1-n-propoxymethyl-1-(dichlorocyclooctyl)-3-phenylurea. |
| 68 | 1-hydroxymethyl-1-cycloheptyl-3-phenylurea | Methyl alcohol | 1-methoxymethyl-1-cycloheptyl-3-phenylurea. |
| 69 | 1-hydroxymethyl-1-(dimethylcyclooctyl)-3-phenylurea | do | 1-methoxymethyl-1-(dimethylcyclooctyl)-3-phenylurea. |
| 70 | 1-hydroxymethyl-1-(dichlorocyclooctyl)-3-phenylurea | do | 1-methoxymethyl-1-(dichlorocyclooctyl)-3-phenylurea. |
| 71 | 1-hydroxymethyl-1-(bromocycloheptyl)-3-phenylurea | do | 1-methoxymethyl-1-(bromocycloheptyl)-3-phenylurea. |
| 72 | 1-hydroxymethyl-1-(dichlorocyclohexyl)-3-phenylurea | do | 1-methoxymethyl-1-(dichlorocyclohexyl)-3-phenylurea. |
| 73 | 1-hydroxymethyl-1-cyclopentyl-3-phenylurea | do | 1-methoxymethyl-1-cyclopentyl-3-phenylurea. |
| 74 | 1-hydroxymethyl-1-cycloocten-2-yl-3-phenylurea | do | 1-methoxymethyl-1-cycloocten-2-yl-3-phenylurea. |
| 75 | 1-hydroxymethyl-1-(chlorocycloheptyl)-3-phenylurea | do | 1-methoxymethyl-1-(chlorocycloheptyl)-3-phenylurea. |
| 76 | 1-hydroxymethyl-1-(dichlorocycloheptyl)-3-phenylurea | do | 1-methoxymethyl-1-(dichlorocycloheptyl)-3-phenylurea. |
| 77 | 1-hydroxymethyl-1-(bromocycloheptyl)-3-phenylurea | Ethyl alcohol | 1-ethoxymethyl-1-(bromocycloheptyl)-3-phenylurea. |
| 78 | 1-hydroxymethyl-1-(methylcycloheptyl)-3-phenylurea | Methyl alcohol | 1-methoxymethyl-1-(methylcycloheptyl)-3-phenylurea. |
| 79 | 1-hydroxymethyl-1-(2-bromocyclohexyl)-3-phenylurea | do | 1-methoxymethyl-1-(2-bromocyclohexyl)-3-phenylurea. |
| 80 | 1-hydroxymethyl-1-(3-bromocyclohexyl)-3-phenylurea | do | 1-methoxymethyl-1-(3-bromocyclohexyl)-3-phenylurea. |
| 81 | 1-hydroxymethyl-1-(dichlorocyclohexyl)-3-phenylurea | sec-Butyl alcohol | 1-sec-butoxymethyl-1-(dichlorocyclohexyl)-3-phenylurea. |
| 82 | 1-hydroxymethyl-1-(2-iodocyclohexyl)-3-phenylurea | Methyl alcohol | 1-methoxymethyl-1-(2-iodocyclohexyl)-3-phenylurea. |
| 83 | 1-hydroxymethyl-1-(o-fluorocyclohexyl)-3-phenylurea | do | 1-methoxymethyl-1-(o-fluorocyclohexyl)-3-phenylurea. |
| 84 | 1-hydroxymethyl-1-(2-chlorocyclohexyl)-3-phenylurea | do | 1-methoxymethyl-1-(2-chlorocyclohexyl)-3-phenylurea. |
| 85 | 1-hydroxymethyl-1-cyclopentyl-3-phenylurea | Ethyl alcohol | 1-ethoxymethyl-1-cyclopentyl-3-phenylurea. |
| 86 | 1-hydroxymethyl-1-(2-methylcyclopentyl)-3-phenylurea | Methyl alcohol | 1-methoxymethyl-1-(2-methylcyclopentyl)-3-phenylurea. |
| 87 | 1-hydroxymethyl-1-(chlorocyclopentyl)-3-phenylurea | iso-Propyl alcohol | 1-isopropoxymethyl-1-(chlorocyclopentyl)-3-phenylurea. |
| 88 | 1-hydroxymethyl-1-(dichlorocyclohexyl)-3-phenylurea | Methyl alcohol | 1-methoxymethyl-1-(dichlorocyclohexyl)-3-phenylurea. |
| 89 | 1-hydroxymethyl-1-(bromocyclopentyl)-3-phenylurea | do | 1-methoxymethyl-1-(bromocyclopentyl)-3-phenylurea. |
| 90 | 1-hydroxymethyl-1-(2-norbornyl)-3-phenylurea | do | 1-methoxymethyl-1-(2-norbornyl)-3-phenylyura. |
| 91 | 1-hydroxymethyl-1-(3-methyl-2-norbornyl)-3-phenylurea | do | 1-methoxymethyl-1-(3-methyl-2-norbornyl)-3-phenylurea. |
| 92 | 1-hydroxymethyl-1-(1,7-dimethyl-2-norbornyl)-3-phenylurea. | do | 1-methoxymethyl-1-(1,7-dimethyl-2-norbornyl)-3-phenylurea. |
| 93 | 1-hydroxymethyl-1-(2-ethylcyclopentyl)-3-phenylurea | do | 1-methoxymethyl-1-(2-ethylcyclopentyl)-3-phenylurea. |
| 94 | 1-hydroxymethyl-1-(3,3-dimethyl-2-norbornyl)-3-phenylurea. | do | 1-methoxymethyl-1-(3,3-dimethyl-2-norbornyl)-3-phenylurea. |
| 95 | 1-hydroxymethyl-1-(5,5-dimethyl-2-norbornyl)-3-phenylurea. | do | 1-methoxymethyl-1-(5,5-dimethyl-2-norbornyl)-3-phenylurea. |
| 96 | 1-hydroxymethyl-1-(chloronorbornyl)-3-phenylurea | do | 1-methoxymethyl-1-(chloronorbornyl)-3-phenylurea. |
| 97 | 1-hydroxymethyl-1-(dichloronorbornyl)-3-phenylurea | do | 1-methoxymethyl-1-(dichloronorbornyl)-3-phenylurea. |
| 98 | 1-hydroxymethyl-1-cyclohexyl-3-m-tolylurea | iso-Butyl alcohol | 1-i-butoxymethyl-1-cyclohexyl-3-m-tolylurea. |
| 99 | 1-hydroxymethyl-1-cyclooctyl-3-m-tolylurea | Ethyl alcohol | 1-ethoxymethyl-1-cyclooctyl-3-m-tolylurea. |
| 100 | 1-hydroxymethyl-1-cyclopentyl-3-m-tolylurea | Methyl alcohol | 1-methoxymethyl-1-cyclopentyl-3-m-tolylurea. |
| 101 | 1-hydroxymethyl-1-(2-methylcyclohexyl)-3-m-tolylurea | Ethyl alcohol | 1-ethoxymethyl-1-(2-methylcyclohexyl)-3-m-tolylurea. |
| 102 | 1-hydroxymethyl-1-(3-methylcyclohexyl)-3-m-tolylurea | iso-Propyl alcohol | 1-i-propoxymethyl-1-(3-methylcyclohexyl)-3-m-tolylurea. |
| 103 | 1-hydroxymethyl-1-cycloheptyl-3-m-tolylurea | Methyl alcohol | 1-methoxymethyl-1-cycloheptyl-3-m-tolylurea. |
| 104 | 1-hydroxymethyl-1-cyclohexyl-3-m-tolylurea | do | 1-methoxymethyl-1-cyclohexyl-3-m-tolylurea. |
| 105 | 1-hydroxymethyl-1-cyclooctyl-3-m-tolylurea | do | 1-methoxymethyl-1-cyclooctyl-3-m-tolylurea. |
| 106 | 1-hydroxymethyl-1-(2-methylcyclohexyl)-3-m-tolylurea | do | 1-methoxymethyl-1-(2-methylcyclohexyl)-3-m-tolylurea. |
| 107 | 1-hydroxymethyl-1-(3-methylcyclohexyl)-3-m-tolylurea | do | 1-methoxymethyl-1-(3-methylcyclohexyl)-3-m-tolylurea. |
| 108 | 1-hydroxymethyl-1-(2-methylcyclohexyl)-3-(o-fluorophenyl)urea | do | 1-methoxymethyl-1-(2-methylcyclohexyl)-3-(o-fluorophenyl)urea. |
| 109 | 1-hydroxymethyl-1-(dimethylcyclooctyl)-3-(o-fluorophenyl)urea. | do | 1-methoxymethyl-1-(dimethylcyclooctyl)-3-(o-fluorophenyl)-urea. |
| 110 | 1-hydroxymethyl-1-(2-chlorocyclohexyl)-3m-tolylurea | do | 1-methoxymethyl-1-(2-chlorocyclohexyl)-3-m-tolylurea. |
| 111 | 1-hydroxymethyl-1-(3-methylcyclohexyl)-3-phenylurea | do | 1-methoxymethyl-1-(3-methylcyclohexyl)-3-phenylurea. |
| 112 | 1-hydroxymethyl-1-(chlorocyclohexylmethyl)-3-phenylurea. | do | 1-methoxymethyl-1-(chlorocyclohexylmethyl)-3-phenylurea. |
| 113 | 1-hydroxymethyl-1-(cyclohexylmethyl)-3-m-tolylurea | do | 1-methoxymethyl-1-cyclohexylmethyl-3-m-tolylurea. |
| 114 | 1-hydroxymethyl-1-cyclohexyl-3-o-tolylurea | do | 1-methoxymethyl-1-cyclohexyl-3-o-tolylurea. |
| 115 | 1-hydroxymethyl-1-(1-methylcyclohexyl)-3-phenylurea | do | 1-methoxymethyl-1-(1-methylcyclohexyl)-3-phenylurea. |
| 116 | 1-hydroxymethyl-1-(2-methylcyclohexyl)-3-(o-fluorophenyl)urea. | Ethyl alcohol | 1-ethoxymethyl-1-(2-methylcyclohexyl)-3-(o-fluorophenyl)-urea. |
| 117 | 1-hydroxymethyl-1-(3-methylcyclohexyl)-3-(o-fluorophenyl)urea. | Methyl alcohol | 1-methoxymethyl-1-(3-methylcyclohexyl)-3-(o-fluorophenyl)urea. |
| 118 | 1-hydroxymethyl-1-cyclohexyl-3-(o-fluorophenyl)urea | do | 1-methoxymethyl-1-cyclohexyl-3-(o-fluorophenyl)urea. |
| 119 | 1-hydroxymethyl-1-cycloheptyl-3-(o-fluorophenyl)urea | do | 1-methoxymethyl-1-cycloheptyl-3-(o-fluorophenyl)urea. |
| 120 | 1-hydroxymethyl-1-cyclooctyl-3-(o-fluorophenyl)urea | do | 1-methoxymethyl-1-cyclooctyl-3-(o-fluorophenyl)urea. |
| 121 | 1-hydroxymethyl-1-(norbornyl)-3-(o-fluorophenyl)urea | do | 1-methoxymethyl-1-(norbornyl)-3-(o-fluorophenyl)urea. |
| 122 | 1-hydroxymethyl-1-(cyclohexylmethyl)-3-o-fluorophenyl)urea. | do | 1-methoxymethyl-1-(cyclohexylmethyl)-3-(o-fluorophenyl) urea. |
| 123 | 1-hydroxymethyl-1-(2,3-dichlorocyclohexyl)-3-(o-fluorophenyl)urea. | do | 1-methoxymethyl-1-(2,3-dichlorocyclohexyl)-3-(o-fluorophenyl)urea. |
| 124 | 1-hydroxymethyl-1-(2-ethylcyclohexyl)-3-phenylurea | do | 1-methoxymethyl-1-(2-ethylcyclohexyl)-3-phenylurea. |
| 125 | 1-hydroxymethyl-1-(3-ethylcyclohexyl)-3-(o-fluorophenyl)urea. | do | 1-methoxymethyl-1-(3-ethylcyclohexyl)-3-(o-fluorophenyl)urea. |
| 126 | 1-hydroxymethyl-1-(2-chlorocyclohexyl)-3-p-tolylurea | do | 1-methoxymethyl-1-(2-chlorocyclohexyl)-3-p-tolylurea. |
| 127 | 1-hydroxymethyl-1-(dimethylcyclooctyl)-3-(o-fluorophenyl)urea. | Ethyl alcohol | 1-ethoxymethyl-1-(dimethylcyclooctyl)-3-(o-fluorophenyl)urea. |
| 128 | 1-hydroxymethyl-1-(dichlorocyclooctyl)-3-(o-fluorophenyl)urea. | Methyl alcohol | 1-methoxymethyl-1-(dichlorocyclooctyl)-3-(o-fluorophenyl)urea. |
| 29 | 1-hydroxymethyl-1-(dichlorocyclooctyl)-3-m-tolylurea | do | 1-methoxymethyl-1-(dichlorocyclooctyl)-3-m-tolylurea. |
| 30 | 1-hydroxymethyl-1-(1-methylcyclohexyl)-3-m-tolylurea | do | 1-methoxymethyl-1-(1-methylcyclohexyl)-3-m-tolylurea. |

| Hydroxy Urea | Mercaptan | Product |
|---|---|---|
| 131. 1-hydroxymethyl-1-(methylcyclcooctyl)-3-phenylurea | Methyl mercaptan | 1-methylthiomethyl-1-(methylcyclooctyl)-3-phenylurea. |
| 132. 1-hydroxymethyl-1-cycloheptyl-3-phenylurea | do | 1-methylthiomethyl-1-cycloheptyl-3-phenylurea. |
| 133. 1-hydroxymethyl-1-cyclopentyl-3-phenylurea | do | 1-methylthiomethyl-1-cyclopentyl-3-phenylurea. |
| 134. 1-hydroxymethyl-1-(2-bromocyclohexyl)-3-phenylurea | do | 1-methylthiomethyl-1-(2-bromocyclohexyl)-3-phenylurea. |
| 135. 1-hydroxymethyl-1-(2-chlorocyclohexyl)-3-phenylurea | do | 1-methylthiomethyl-1-(2-chlorocyclohexyl)-3-phenylurea. |
| 136. 1-hydroxymethyl-1-(2,3-dichlorocyclohexyl)-3-phenylurea | Ethyl mercaptan | 1-ethylthiomethyl-1-(2,3-dichlorocyclohexyl)-3-phenylurea. |
| 137. 1-hydroxymethyl-1-(3-methyl-2-norbornyl)-3-phenylurea | Methyl mercaptan | 1-methylthiomethyl-1-(3-methyl-2-norbornyl)-3-phenylurea. |
| 138. 1-hydroxymethyl-1-(3-methylcyclohexyl)-3-m-tolylurea | Isopropyl mercaptan | 1-isopropylthiomethyl-1-(3-methylcyclohexyl)-3-m-tolylurea. |
| 139. do | Sec-Butyl mercaptan | 1-sec-butylthiomethyl-1-(3-methylcyclohexyl)-3-m-tolylurea. |
| 140. 1-hydroxymethyl-1-(cyclohexylmethyl)-3-m-tolylurea | Methyl mercaptan | 1-methylthiomethyl-1-cyclohexylmethyl-3-m-tolylurea. |
| 141. 1-hydroxymethyl-1(2-methylcyclohexyl)-3-phenylurea | do | 1-methylthiomethyl-1-(2-methylcyclohexyl)-3-phenylurea. |

EXAMPLE 142

1-[hydroxypoly(methoxy)methyl]-1-(2-methylcyclohexyl)-3-phenylurea

A mixture consisting of 10 parts by weight of 1-phenyl-3-(2-methylcyclohexyl)urea, 2 parts by weight of barium hydroxide octahydrate, 450 parts by weight of 37% aqueous formaldehyde solution and 300 parts by weight of dioxane is refluxed for 30 minutes. To the cooled mixture is added 100 parts by weight of water. The mixture is then filtered. The filtrate is extracted three times with 200 parts by weight of methylene chloride. The organic extracts are combined and washed with 100 parts by weight of water. Upon drying, filtration and evaporation, an oil, 1-[hydroxypoly(methoxy)methyl]-1-(2-methylcyclohexy)-3-phenylurea is obtained.

The following granular composition is formulated:

| | Percent |
|---|---|
| 1-[hydroxypoly(methoxy)methyl] - 1 - (2-methylcyclohexyl) - 3 - phenylurea | 2 |
| 15–30 mesh attaclay granules | 98 |

The active material can be applied to the attaclay granules in several ways. (1) The active material can be dissolved in a volatile solvent such as acetone and sprayed on the tumbling granules, or (2) wettable powder containing the active material can be distributed on the surface of the granules. By moistening with water or a mixture of water and ethylene glycol dusting off is prevented.

This granular formulation is applied preemergence with a granule spreader at the rate of 6 to 8 pounds active ingredient per acre for the control of growth of crabgrass and foxtails in an area of established bluegrass-meadow fescue. The crabgrass and foxtails germinate but fail to grow.

EXAMPLES 143–200

The following products are prepared in the manner of the 1-[hydroxypoly(methoxy)methyl]-1-(2-methylcyclohexyl)-3-phenylurea of Example 142 by substituting for the 1-phenyl-3-(2-methylcyclohexyl)urea a like amount by weight of the following ureas.

The products are each formulated and applied in like manner to provide like results.

| | Urea | Product |
|---|---|---|
| 143 | 1-cyclooctyl-3-phenylurea | 1-[hydroxypoly(methoxy)methyl]-1-cyclooctyl-3-phenylurea. |
| 144 | 1-(chlorocyclooctyl)-3-phenylurea | 1-[hydroxypoly(methoxy)methyl]-1-(chlorocyclooctyl)-3-phenylurea. |
| 145 | 1-(dibromocyclooctyl)-3-phenylurea | 1-[hydroxypoly(methoxy)methyl]-1-(dibromocyclooctyl)-3-phenylurea. |
| 146 | 1-(methylcyclooctyl)-3-phenylurea | 1-[hydroxypoly(methoxy)methyl]-1-(methylcyclooctyl)-3-phenylurea. |
| 147 | 1-(dimethylcyclooctyl)-3-phenylurea | 1-[hydroxypoly(methoxy)methyl]-1-(dimethylcycloctyl)-3-phenylurea. |
| 148 | 1-(flurocyclooctyl)-3-phenylurea | 1-[hydroxypoly(methoxy)methyl]-1-(fluorocyclooctyl)-3-phenylurea. |
| 149 | 1-(dichlorocyclooctyl)-3-phenylurea | 1-[hydroxypoly(methoxy)methyl]-1-(dichlorocyclooctyl)-3-phenylurea. |
| 150 | 1-cycloheptyl-3-phenylurea | 1-[hydorxypoly(methoxy)methyl]-1-(cycloheptyl)-3-phenylurea. |
| 151 | 1-(chlorocycloheptyl)-3-phenylurea | 1-[hydroxypoly(methoxy)methyl]-1-(chlorocycloheptyl)-3-phenylurea. |
| 152 | 1-(dichlorocycloheptyl)-3-phenylurea | 1-[hydroxypoly(methoxy)methyl]-1-dichlorocycloheptyl)-3-phenylurea; |
| 153 | 1-cyclohexen-2-yl-3-phenylurea | 1-[hydroxypoly(methoxy)methyl]-1-cyclohexen-2-yl-3-phenylurea. |
| 154 | 1-(methylcycloheptyl)-3-phenylurea | 1-[hydroxypoly(methoxy)methyl]-1-(methylcycloheptyl)-3-phenylurae. |
| 155 | 1-(2-bromocyclohexyl)-3-phenylurea | 1-[hydroxypoly(methoxy)methyl]-1-(2-bromocyclohexyl)-3-phenylurea. |
| 156 | 1-(3-bromocyclohexyl)-3-phenylurea | 1-[hydroxypoly(methoxy)methyl]-1-(3-bromocyclohexyl)-3-phenylurea. |
| 157 | 1-(dichlorocyclohexyl)-3-phenylurea | 1-[hydroxypoly(methoxy)methyl]-1-(dichlorocyclohexyl)-3-phenylurea. |
| 158 | 1-(2-iodocyclohexyl)-3-phenylurea | 1-[hydroxypoly(methoxy)methyl]-1-(2-iodocyclohexyl)-3-phenylurea. |
| 159 | 1-(2-fluorocyclohexyl)-3-phenylurea | 1-[hydroxypoly(methoxy)methyl]-1-(2-fluorocyclohexyl)-3-phenylurea. |
| 160 | 1-(2-chlorocyclohexyl)-3-phenylurea | 1-[hydroxypoly(methoxy)methyl]-1-(2-chlorocyclohexyl)-3-phenylurea. |
| 161 | 1-cyclopentyl-3-phenylurea | 1-[hydroxypoly(methoxy)methyl]-1-cyclopentyl-3-phenylura. |
| 162 | 1-(2-methylcyclopentyl)-3-phenylurea | 1-[hydroxypoly(methoxy)methyl]-1-(2-methylcyclopentyl)-3-phenylurea. |
| 163 | 1-(chlorocyclopenytl)-3-phenylurea | 1-[hydroxypoly(methoxy)methyl]-1-(chlorocyclopenyl)-3-phenylurea. |
| 164 | 1-(dichlorocyclopentyl)-3-phenylurea | 1-[hydroxypoly(methoxy)methyl]-1-(dichlorocyclopentyl)-3-phenylurea. |
| 165 | 1-(bromocyclopentyl)-3-phenylurea | 1-[hydroxypoly(methoxy)methyl]-1-(bromocyclopentyl)-3-phenylurea. |
| 166 | 1-(2-norbornyl)-3-phenylurea | 1-[hydroxypoly(methoxy)methyl]-1-(2-norbornyl)-3-phenylurea. |
| 167 | 1-(3-methyl-2-norbornyl)-3-phenylurea | 1-[hydroxypoly (methoxy)methyl]-1-(3-methyl-2-norbornyl)-3-phenylurea. |
| 168 | 1-(1,7-dimethyl-2-norbornyl)-3-phenylurea | 1-[hydroxypoly(methoxy)methyl]-1-(1,7-dimethyl-2-norbornyl)-3-phenylurea. |
| 169 | 1-(2-ethylcyclopentyl)-3-phenylurea | 1-[hydroxypoly(methoxy)methyl]-1-(2-ethylcyclopentyl)-3-phenylurea. |
| 170 | 1-(3,3-dimethyl-2-norbornyl)-3-phenylurea | 1-[hydroxypoly(methoxy)methyl]-1-(3,3-dimethyl-2-norbornyl)-3-phenylurea. |
| 171 | 1-(5,5-dimethyl-2-norbornyl)-3-phenylurea | 1-[hydroxypoly(methoxy)methyl]-1-(5,5-dimethyl-2-norbornyl)-3-phenylurea. |
| 172 | 1-(chloronorbornyl)-3-phenylurea | 1-[hydroxypoly(methoxy)methyl]-1-(chloronorbornyl)-3-phenylurea. |
| 173 | 1-(dichloronorbornyl)-3-phenylurea | 1-[hydroxypoly(methoxy)methyl]-1-(dichloronorbornyl)-3-phenylurea. |
| 174 | 1-cyclohexyl-3-m-tolylurea | 1-[hydroxypoly(methoxy)methyl]-1-cyclohexyl-3-m-tolylurea. |
| 175 | 1-cyclooctyl-3-m-tolylurea | 1-[hydroxypoly(methoxy)methyl]-1-cyclooctyl-3-m-tolylurea. |
| 176 | 1-cyclopentyl-3-m-tolylurea | 1-[hydroxypoly(methoxy)methyl]-1-cyclopentyl-3-m-tolylurea. |
| 177 | 1-(2-methylcyclohexyl)-3-m-tolylurea | 1-[hydroxypoly(methoxy)methyl]-1-(2-methylcyclohexyl)-3-m-tolylurea. |
| 178 | 1-(3-methylcyclohexyl)-3-m-tolylurea | 1-[hydroxypoly(methoxy)methyl]-1-(3-methylcyclohexyl)-3-m-tolylurea. |
| 179 | 1-cycloheptyl-3-m-tolylurea | 1-[hydroxypoly(methoxy)methyl]-1-cycloheptyl-3-m-tolylurea. |
| 180 | 1-(2-chlorocyclohexyl)-3-m-tolylurea | 1-[hydroxypoly(methoxy)methyl]-1-(2-chlorocyclohexyl)-3-m-tolylurea. |
| 181 | 1-(3-methylcyclohexyl)-3-phenylurea | 1-[hydroxypoly(methoxy)methyl]-1-(3-methylcyclohexyl)-3-phenylurea. |
| 192 | 1-(chlorocyclohexylmethyl)-3-phenylurea | 1-[hydroxypoly(methoxy)methyl]-1-(chlorocyclohexylmethyl)-3-phenylurea. |
| 183 | 1-cyclohexylmethyl-3-m-tolylurea | 1-[hydroxypoly(methoxy)methyl]-1-cyclohexylmethyl-3-m-tolylurea. |
| 184 | 1-cyclohexyl-3-o-tolylurea | 1-[hydroxypoly(methoxy)methyl]-1-cyclohexyl-3-o-tolylurea. |
| 185 | 1-(1-methylcyclohexyl)-3-phenylurea | 1-[hydroxypoly(methoxy)methyl]-1-(1-methylcyclohexyl)-3-phenylurea. |
| 186 | 1-(2-methylcyclohexyl)-3-(o-fluorophenyl)urea | 1-[hydroxypoly(methoxy)methyl]-1-(2-methylcyclohexyl)-3-(o-fluorophenyl)urea. |
| 187 | 1-(3-methylcyclohexyl)-3-(2-fluorophenyl)urea | 1-[hydroxypoly(methoxy)methyl]-1-(3-methylcyclohexyl)-3-(2-fluorophenyl)urea. |
| 188 | 1-cyclohexyl-3-(o-fluorophenyl)urea | 1-[hydroxypoly(methoxy)methyl]-1-cyclohexyl-3-(o-fluorophenyl)-urea. |
| 189 | 1-cycloheptyl-3-(o-fluorophenyl)urea | 1-[hydroxypoly(methoxy)methyl]-1-cycloheptyl-3-(o-fluorophenyl)urea. |
| 190 | 1-cyclooctyl-3-(o-fluorophenyl)urea | 1-[hydroxypoly(methoxy)methyl]-1-cyclooctyl-3-(o-fluorophenyl)urea. |
| 191 | 1-(norbornyl)-3-(o-fluorophenyl)urea | 1-[hydroxypoly(methoxy)methyl]-1-(norbornyl)-3-(o-fluorophenyl)urea. |
| 192 | 1-(cyclohexylmethyl)-3-(o-fluorophenyl)urea | 1-[hydroxypoly(methoxy)methyl]-1-cyclohexylmethyl-3-(o-fluorophenyl)urea. |
| 193 | 1-(2,3-dichlorocyclohexyl)-3-(o-fluorophenyl)urea | 1-[hydroxypoly(methoxy)methyl]-1-(2,3-dichlorocyclohexyl)-3-(o-fluorophenyl)urea. |
| 194 | 1-(2-ethylcyclohexyl)-3-phenylurea | 1-[hydroxypoly(methoxy)methyl]-1-(2-ethylcyclohexyl)-3-phenylurea. |
| 195 | 1-(3-ethylcyclohexyl)-3-(o-fluorophenyl)urea | 1-[hydroxypoly(methoxy)methyl]-1-(3-ethylcyclohexyl)-3-(o-fluorophenyl)urea. |
| 196 | 1-(2-chlorocyclohexyl)-3-p-tolylurea | 1-[hydroxypoly(methoxy)methyl]-1-(2-chlorocyclohexyl)-3-p-tolylurea. |
| 197 | 1-(dimethylcyclooctyl)-3-(o-fluorophenyl)urea | 1-[hydroxypoly(methoxy)methyl]-1-(dimethylcyclooctyl)-3-(o-fluorophenyl)urea. |
| 198 | 1-(dichlorocyclooctyl)-3-(o-fluorophenyl)urea | 1-[hydroxypoly(methoxy)methyl]-1-(dichlorocyclooctyl)-3-(o-fluorophenyl)urea. |
| 199 | 1-(dichlorocyclooctyl)-3-m-tolylurea | 1-[hydroxpoly(methoxy)methyl]-1-(dichlorocyclooctyl)-3-m-tolylurea. |
| 200 | 1-(1-methylcyclohexyl)-3-m-tolylurea | 1-[hydroxypoly(methoxy)methyl]-1-(1-methylcyclohexyl)-3-m-tolylurea. |

EXAMPLE 201

The following emulsifiable oil can be extended with either oil or water:

| | Percent |
|---|---|
| 1-hydroxymethyl-1-(3-methylcyclohexyl)-3-phenylurea | 15 |
| A blend of polyoxyethylene ethers and soil soluble sulfonates | 5 |
| Alkylated naphthalene (principally alpha-methylnaphthalene) | 70 |
| Dimethylformamide | 10 |

The above components are blended and agitated until a homogeneous mixture is obtained.

This emulsifiable formulation is extended with 80 gallons of diesel oil and applied at the rate of 12 pounds active ingredient per acre to a stone walk infested with crabgrass, foxtails and barnyardgrass. Excellent growth regulation of these weeds is obtained. Weed seeds germinating after treatment show severe retardation.

A pre-emergence application of the above formulation at the rate of 3 to 6 pounds of active ingredient per acre in 40 gallons of water gives excellent retardation of crabgrass and barnyardgrass in a newly planted field of soybeans.

EXAMPLE 202

| | Percent |
|---|---|
| 1-hydroxymethyl-1-(2-methylcyclohexyl)-3-o-fluorophenylurea | 20 |
| Calcium lignin sulfonate | 2 |
| Alkylnaphthalene sulfonic acid, Na salt | 2 |
| $CaSO_4 \cdot 2H_2O$ | 1 |
| Tricalcium phosphate | 7 |
| Attapulgite clay | 68 |

The ingredients are mixed and micropulverized to a particle size essentially below 50 microns and then reblended.

The above formulation is applied at a rate of 3 to 6 pounds of active ingredient in 60 gallons of water for the pre-emergence control of crabgrass in a field of newly seeded peanuts. Germinating crabgrass seedlings are retarded markedly. The growth of peanuts is not affected by this treatment.

EXAMPLE 203

The following pellet formulation is used:

| | Percent |
|---|---|
| 1-hydroxymethyl-1-(2-methylcyclohexyl)-3-m-tolylurea | 11 |
| Anhydrous sodium sulfate | 10 |
| Mississippi sub-bentonite clay | 33 |
| Kaolin clay | 33 |
| Lignin sodium sulfonate | 13 |

These ingredients are mixed and blended by micropulverizing. Approximately 18% water as calculated on a wet basis is added to the formulation and thoroughly mixed. The resulting product is extruded into pellets through a screw type extruder fitted with a die containing orifices of 3/32 inch. The extruded strands are conveniently chopped into small pellets as they come out of the extruder die. The pellets are air-dried. After drying the pellets can be easily handled and applied as such. However, they readily soften and disintegrate when mildly agitated in water and can also be applied in water rather than as dry pellets.

EXAMPLE 204

A dust formulation is prepared from any compound of Formula I of this invention as follows:

| | Percent |
|---|---|
| 1-methoxymethyl-1-cyclooctyl-3-phenylurea | 5 |
| Talc | 75 |
| Attapulgite clay | 20 |

The ingredients are mixed and micropulverized to a state of subdivision in which most of the individual particles are below 50 microns in size.

EXAMPLE 205

A 10-5-5 fertilizer mixture:

| | Percent |
|---|---|
| Diammonium phosphate | 10.9 |
| Ammonium sulfate | 36.5 |
| Tankage (4%N) | 15.0 |
| Potassium chloride | 8.4 |
| 1-hydroxymethyl-1-(2-methylcyclohexyl)-3-phenylurea | 0.6 |
| Limestone | 28.6 |

The above mixture is prepared by blending the ingredients in regular fertilizer blending equipment. An application of 40 pounds of this mixture to 1000 square feet of turf gives a treatment of active ingredient at a rate of 10 pounds per acre. An application of this mixture at the indicated rate will give good pre-emergence control of crabgrass in established Kentucky bluegrass.

EXAMPLE 206

A 10-5-5 fertilizer chlordane mixture:

| | Percent |
|---|---|
| Diammonium phosphate | 10.90 |
| Ureaform (38%N) | 20.00 |
| Tankage (4%N) | 12.50 |
| Potassium chloride | 8.40 |
| 1-hydroxymethyl-1-(2-methylcyclohexyl)-3-phenylurea | 0.35 |
| Chlordane | 0.35 |
| Limestone | 47.50 |

This mixture is prepared by blending the ingredients in regular fertilizer blending equipment. An application of this mixture to soil at a rate of 40 pounds per 1000 square feet gives a treatment of 6 pounds per acre of active ingredient. The use of this mixture to established turf before germination of weed grasses will result in good control of crabgrass and other seedling weed grasses, such as foxtail and barnyardgrass.

EXAMPLE 207

1,3-bis(hydroxymethyl)-1-cyclohexyl-3-(cyclohexylmethyl)urea

A mixture consisting of 10 parts by weight of 1-cyclohexyl-3-(cyclohexylmethyl)urea, 3 parts by weight of barium hydroxide octahydrate, 150 parts by weight of 37% aqueous formaldehyde and 150 parts by weight of dioxane is refluxed for 45 minutes. To the cooled mixture is added 150 parts by weight of water; the mixture is then filtered and the filtrate is extracted three times with 200 parts by weight of methylenechloride. The orgic extracts are combined and washed in turn with 100 parts by weight of water, 100 parts by weight of 0.5% aqueous hydrochloric acid solution and finally 100 parts by weight of water. The organic phase is dried, and evaporated yielding 1,3-bis(hydroxymethyl)-1-cyclohexyl-3-cyclohexylmethylurea.

| | Percent |
|---|---|
| 1,3-bis(hydroxymethyl)-1-cyclohexyl-3-cyclohexylmethylurea | 25.00 |
| Alkylnaphthalene sulfonic acid, Na salt | 1.00 |
| Low viscosity methyl cellulose | 0.25 |
| Attapulgite clay | 73.75 |

The above components are blended and micropulverized until homogeneous and then reblended.

The formulation described above is applied premergence at the rate of 5 to 8 pounds of active ingredient per acre in 100 gallons of water for the control of growth of crabgrass in areas containing established Kentucky 31 fescue. Excellent retardation of crabgrass is obtained without noticeable damage to the desirable turf grasses.

EXAMPLES 208–234

The following products are prepared in the manner of the 1,3-bis(hydroxymethyl)-1-cyclohexyl-3-cyclohexylmethylurea of Example 207 by substituting for the 1-cyclohexyl-3-(cyclohexylmethyl)urea of Example 207 a like amount by weight of the following ureas.

The products are each formulated and applied in like manner as the product of Example 207 to provide like results.

1,3-bis(hydroxymethyl)-1-cyclohexyl-3-(cyclohexylmethyl)urea.

|  | Percent |
|---|---|
| 1-hydroxymethyl-1-cyclohexyl-3-(cyclohexylmethyl)urea | 20 |
| Calcium lignin sulfonate | 2 |
| Alkylnaphthalene sulfonic acid, Na salt | 2 |
| CaSO$_4$·2H$_2$O | 1 |
| Tricalcium phosphate | 7 |
| Attapulgite clay | 68 |

| Ex. | Urea | Product |
|---|---|---|
| 208 | 1-(2-methylcyclohexyl)-3-cyclohexylurea | 1,3-bis(hydroxymethyl)-1-(2-methylcyclohexyl)-3-cyclohexylurea. |
| 209 | 1-cyclohexyl-3-cyclooctylurea | 1,3-bis(hydroxymethyl)-1-cyclohexyl-3-cyclooctylurea. |
| 210 | 1-(2-chlorocyclohexyl)-3-cyclohexylurea | 1,3-bis(hydroxymethyl)-1-(2-chlorocyclohexyl)-3-cyclohexylurea. |
| 211 | 1-(2-bromocyclohexyl)-3-cyclopentylurea | 1,3-bis(hydroxymethyl)-1-(2-bromocyclohexyl)-3-cyclopentylurea. |
| 212 | 1-(3-bromocyclohexyl)-3-cycloheptylurea | 1,3-bis(hydroxymethyl)-1-(3-bromocyclohexyl)-3-cycloheptylurea. |
| 213 | 1-(dichlorocyclohexyl)-3-cyclooctylurea | 1,3-bis(hydroxymethyl)-1-(dichlorocyclohexyl)-3-cyclooctylurea. |
| 214 | 1-(2-iodocyclohexyl)-3-(2-methylcyclohexyl)urea | 1,3-bis(hydroxymethyl)-1-(2-iodocyclohexyl)-3-(2-methylcyclohexyl)urea. |
| 215 | 1-cyclohexyl-3-cycloheptylurea | 1,3-bis(hydroxymethyl)-1-cyclohexyl-3-cycloheptylurea. |
| 216 | 1-(2-norbornylmethyl)-3-cyclohexylurea | 1,3-bis(hydroxymethyl)-1-(2-norbornylmethyl)-3-cyclohexylurea. |
| 217 | 1-(bicyclooctyl)-3-cyclohexylurea | 1,3-bis(hydroxymethyl)-1-(bicyclooctyl)-3-cyclohexylurea. |
| 218 | 1-cyclopentyl-3-(2-methylcyclohexyl)urea | 1,3-bis(hydroxymethyl)-1-cyclopentyl-3-(2-methylcyclohexyl)urea. |
| 219 | 1-(2-methylcyclopentyl)-3-cyclohexylurea | 1,3-bis(hydroxymethyl)-1-(2-methylcyclopentyl)-3-cyclohexylurea. |
| 220 | 1-(chlorocyclopentyl)-3-cycloheptylurea | 1,3-bis(hydroxymethyl)-1-(chlorocyclopentyl)-3-cycloheptylurea. |
| 221 | 1-(dichlorocyclopentyl)-3-cyclooctylurea | 1,3-bis(hydroxymethyl)-1-(dihclorocyclopentyl)-3-cyclooctylurea. |
| 222 | 1-cyclohexyl-3-cyclopenten-2-ylurea | 1,3-bis(hydroxymethyl)-1-cyclohexyl-3-cyclopenten-2-ylurea. |
| 223 | 1-(cyclohexylmethyl)-3-cycloheptylurea | 1,3-bis(hydroxymethyl)-1-cyclohexylmethyl-3-cycloheptylurea. |
| 224 | 1-cycloheptyl-3-(3-methylcyclohexyl)urea | 1,3-bis(hydroxymethyl)-1-cycloheptyl-3-(3-methylcyclohexyl)urea. |
| 225 | 1-cyclopentyl-3-cyclooctylurea | 1,3-bis(hydroxymethyl)-1-cyclopentyl-3-cyclooctylurea. |
| 226 | 1-(2-methylcyclopentyl)-3-cyclopentylurea | 1,3-bis(hydroxymethyl)-1-(2-methylcyclopentyl)-3-cyclopentylurea. |
| 227 | 1-(2-methylcyclohexyl)-3-cyclopentylurea | 1,3-bis(hydroxymethyl)-1-(2-methylcyclohexyl)-3-cyclopentylurea. |
| 228 | 1-(3-methylcyclohexyl)-3-cyclopentylurea | 1,3-bis(hydroxymethyl)-1-(3-methylcyclohexyl)-3-cyclopentylurea. |
| 229 | 1-cyclohexyl-3-(1,3-dimethylcyclohexyl)urea | 1,3-bis(hydroxymethyl)-1-cyclohexyl-3-(1,3-dimethylcyclohexyl)urea. |
| 230 | 1-cyclohexyl-3-(3-methylcyclohexyl)urea | 1,3-bis(hydroxymethyl)-1-cyclohexyl-3-(3-methylcyclohexyl)urea. |
| 231 | 1-cyclohexylmethyl-3-cyclopentylurea | 1,3-bis(hydroxymethyl)-1-cyclohexylmethyl-3-cyclopentylurea. |
| 232 | 1-(2-chlorocyclohexyl)-3-cyclooctylurea | 1,3-bis(hydroxymethyl)-1-(2-chlorocyclohexyl)-3-cyclooctylurea. |
| 233 | 1-(2-methylcyclohexyl)-3-(2-fluorocyclohexyl)urea | 1,3-bis(hydroxymethyl)-1-(2-methylcyclohexyl)-3-(2-fluorocyclohexyl)urea. |
| 234 | 1-cyclohexen-2-yl-3-cycloocten-3-ylurea | 1,3-bis(hydroxymethyl)-1-cyclohexen-2-yl-3-cycloocten-3-ylurea. |

EXAMPLE 235

Mixture of 1-hydroxymethyl-1-cyclohexyl-3-(cyclohexylmethyl)urea and 1-hydroxymethyl-1-(cyclohexylmethyl)-3-cyclohexylurea A mixture consisting of 10 parts by weight of 1-cyclohexyl-3-cyclohexylmethylurea, 1 part by weight of barium hydroxide octahydrate, 30 parts by weight of 37% aqueous formaldehyde solution and 100 parts by weight of dioxane is stirred at a temperature below 40° C. for 24 hours. To the cooled mixture is added 75 parts by weight of water. The whole is filtered and the filtrate extracted three times with 200 parts by weight of methylene chloride. The organic extracts are combined and washed in turn with 100 parts by weight of water, 100 parts by weight of 0.5% aqueous hydrochloric acid and finally by 100 parts by weight of water. The organic phase is dried and then evaporated to yield a colorless oil containing mainly the isomeric 1-hydroxymethyl-1-cyclohexyl-3-(cyclohexylmethyl)urea. There is also a small yield of 1,3-bis(hydroxymethyl)-1-cyclohexyl-3-(cyclohexylmethyl)urea.

The ingredients are mixed and micropulverized to a particle size essentially below 50 microns and then re-blended.

The above formulation is applied at the rate of 3 to 6 pounds of active ingredient in 60 gallons of water for the pre-emergence control of crabgrass in a field of newly seeded peanuts. Germinating crabgrass seedlings are retarded markedly. The growth of peanuts is not affected by this treatment.

EXAMPLES 236–264

The following products are prepared in the manner of the isomeric 1-hydroxymethyl-1-cyclohexyl-3-cyclohexylmethylurea and 1,3-bis(hydroxymethyl)-1-cyclohexyl-3-cyclohexylmethylurea of Example 235 by substituting for the 1-cyclohexyl-3-cyclohexylmethylurea of Example 235 a like amount by weight of the following ureas.

The products are each formulated and applied in like manner as the products of Example 235 to provide like results.

| Ex. | Urea | Major Products | Minor Product |
|---|---|---|---|
| 236 | 1-(2-methylcyclohexyl)-3-cyclohexylurea | 1-hydroxymethyl-1-(2-methylcyclohexyl)-3-cyclohexylurea; 1-hydroxymethyl-1-cyclohexyl-3-(2-methylcyclohexyl)urea. | 1,3-bis(hydroxymethyl)-1-(2-methylcyclohexyl)-3-cyclohexylurea. |
| 237 | 1-cyclohexyl-3-cyclooctylurea | 1-hydroxymethyl-1-cyclohexyl-3-cyclooctylurea; 1-hydroxymethyl-1-cyclooctyl-3-cyclohexylurea. | 1,3-bis(hydroxymethyl)-1-cyclohexyl-3-cyclooctylurea. |
| 238 | 1-(2-chloroocyclohexyl)-3-cyclohexylurea | 1-hydroxymethyl-1-(2-chlorocyclohexyl)-3-cyclohexylurea; 1-hydroxymethyl-1-cyclohexyl-3-(2-chlorocyclohexyl)urea. | 1,3-bis(hydroxymethyl)-1-(2-chlorocyclohexyl)-3-cyclohexylurea. |
| 239 | 1-(2-bromocyclohexyl)-3-cyclopentylurea | 1-hydroxymethyl-1-(2-bromocyclohexyl)-3-cyclopentylurea; 1-hydroxymethyl-1-(cyclopentyl)-3-(2-bromocyclohexyl)urea. | 1,3-bis(hydroxymethyl)-1-(2-bromocyclohexyl)-3-cyclopentylurea. |
| 240 | 1-(3-bromocyclohexyl)-3-cycloheptylurea | 1-hydroxymethyl-1-(3-bromocyclohexyl)-3-cycloheptylurea; 1-hydroxymethyl-1-cycloheptyl-3-(3-bromocyclohexyl)urea. | 1,3-bis(hydroxymethyl)-1-(3-bromocyclohexyl)-3-cycloheptylurea. |
| 241 | 1-(dichlorocyclohexyl)-3-cyclooctylurea | 1-hydroxymethyl-1-(dichlorocyclohexyl)-3-cyclooctylurea; 1-hydroxymethyl-1-cyclooctyl-3-(dichlorocyclohexyl)urea. | 1,3-bis(hydroxymethyl)-1-(dichlorocyclohexyl)-3-cyclooctylurea. |
| 242 | 1-(2-iodocyclohexyl)-3-(2-methylcyclohexyl)urea | 1-hydroxymethyl-1-(2-iodocyclohexyl)-3-(2-methylcyclohexyl)urea; 1-hydroxymethyl-1-(2-methylcyclohexyl)-3-(2-iodocyclohexyl)urea. | 1,3-bis(hydroxymethyl)-1-(2-iodocyclohexyl)-3-(2-methylcyclohexyl)urea. |
| 243 | 1-cyclohexyl-3-cycloheptylurea | 1-hydroxymethyl-1-cyclohexyl-3-cycloheptylurea; 1-hydroxymethyl-1-cyclooctyl-1-cyclohexylurea. | 1,3-bis(hydroxymethyl)-1-cyclohexyl-3-cycloheptylurea. |
| 244 | 1-(2-norbornylmethyl)-3-cyclohexylurea | 1-hydroxymethyl-1-(2-norbonylmethyl)-1-cyclohexylurea; 1-hydroxymethyl-1-cyclohexyl-3-(2-norbornylmethyl)urea. | 1,3-bis(hydroxymethyl)-1-(2-norbornylmethyl)-3-cyclohexylurea. |
| 245 | 1-(bicyclooctyl)-3-cyclohexylurea | 1-hydroxymethyl-1-(bicyclooctyl)-3-cyclohexylurea; 1-hydroxymethyl-1-cyclohexyl-3-(bicyclooctyl)urea. | 1,3-bis(hydroxymethyl)-1-(bicyclooctyl)-3-cyclohexylurea. |

| Ex. | Urea | Major Products | Minor Product |
| --- | --- | --- | --- |
| 246 | 1-cyclopentyl-3-(2-methylcyclohexyl)urea | 1-hydroxymethyl-1-cyclopentyl-3-(2-methylcyclohexyl)urea; 1-hydroxymethyl-1-(2-methylcyclohexyl)-3-cyclopentylurea. | 1,3-bis(hydroxymethyl)-1-cyclopentyl-3-(2-methylcyclohexyl)urea. |
| 247 | 1-(2-methylcyclopentyl)-3-cyclohexylurea | 1-hydroxymethyl-1-(2-methylcyclopentyl)-3-cyclohexylurea; 1-hydroxymethyl-1-cyclohexyl-3-(2-methylcyclopentyl)urea. | 1,3-bis(hydroxymethyl)-1-(2-methylcyclopentyl)-3-cyclohexylurea. |
| 248 | 1-(chlorocyclopentyl)-3-cycloheptylurea | 1-hydroxymethyl-1-(chlorocyclopentyl)-3-cycloheptylurea; 1-hydroxymethyl-1-cycloheptyl-3-(chlorocyclopentyl)urea. | 1,3-bis(hydroxymethyl)-1-(chlorocyclopentyl)-3-cycloheptylurea. |
| 249 | 1-(dichlorocyclopentyl)-3-cyclooctylurea | 1-hydroxymethyl-1-(dichlorocyclopentyl)-3-cyclooctylurea; 1-hydroxymethyl-1-cyclooctyl-3-(dichlorocyclopentyl)urea. | 1,3-bis(hydroxymethyl)-1-(dichlorocyclopentyl)-3-cyclooctylurea. |
| 250 | 1-(bromocyclopentyl)-3-cyclopentylurea | 1-hydroxymethyl-1-(bromocyclopentyl)-3-cyclopentylurea; 1-hydroxymethyl-1-cyclopentyl-3-(bromocyclopentyl)urea. | 1,3-bis(hydroxymethyl)-1-(bromocyclopentyl)-3-cyclopentylurea. |
| 251 | 1-(cyclohexylmethyl)-3-cycloheptylurea | 1-hydroxymethyl-1-cyclohexylmethyl-3-cycloheptylurea; 1-hydroxymethyl-1-cycloheptyl-3-cyclohexylmethylurea. | 1,3-bis(hydroxymethyl)-1-cyclohexylmethyl-3-cycloheptylurea. |
| 252 | 1-cycloheptyl-3-(3-methylcyclohexyl)urea | 1-hydroxymethyl-1-cycloheptyl-3-(3-methylcyclohexyl)urea; 1-hydroxymethyl-1-(3-methylcyclohexyl)-3-cycloheptylurea. | 1,3-bis(hydroxymethyl)-1-cycloheptyl-3-(3-methylcyclohexyl)urea. |
| 253 | 1-cyclopentyl-3-cyclooctylurea | 1-hydroxymethyl-1-cyclopentyl-3-cyclooctylurea; 1-hydroxymethyl-1-cyclooctyl-3-cyclopentylurea. | 1,3-bis(hydroxymethyl)-1-cyclopentyl-3-cyclooctylurea. |
| 254 | 1-(2-methylcyclopentyl)-3-cyclopentylurea | 1-hydroxymethyl-1-(2-methylcyclopentyl)-3-cyclopentylurea; 1-hydroxymethyl-1-cyclopentyl-3-(2-methylcyclopentyl)urea. | 1,3-bis(hydroxymethyl)-1-(2-methylcyclopentyl)-3-cyclopentylurea. |
| 255 | 1-(2-methylcyclohexyl)-3-cyclopentylurea | 1-hydroxymethyl-1-(2-methylcyclohexyl)-3-cyclopentylurea; 1-hydroxymethyl-1-cyclopentyl-3-(2-methylcyclohexyl)urea. | 1,3-bis(hydroxymethyl)-1-(2-methylcyclohexyl)-3-cyclopentylurea. |
| 256 | 1-(3-methylcyclohexyl)-3-cyclopentylurea | 1-hydroxymethyl-1-(3-methylcyclohexyl)-3-cyclopentylurea; 1-hydroxymethyl-1-cyclopentyl-3-(3-methylcyclohexyl)urea. | 1,3-bis(hydroxymethyl)-1-(3-methylcyclohexyl)-3-cyclopentylurea. |
| 257 | 1-cyclohexyl-3-(1,3-dimethylcyclohexyl)urea | 1-hydroxymethyl-1-cyclohexyl-3-(1,3-dimethylcyclohexyl)urea; 1-hydroxymethyl-1-(1,3-dimethylcyclohexyl)-3-cyclohexylurea. | 1,3-bis(hydroxymethyl)-1-cyclohexyl-3-(1,3-dimethylcyclohexyl)urea. |
| 258 | 1-cyclohexyl-3-(3-methylcyclohexyl)urea | 1-hydroxymethyl-1-cyclohexyl-3-(3-methylcyclohexyl)urea; 1-hydroxymethyl-1-(3-methylcyclohexyl)-3-cyclohexylurea. | 1,3-bis(hydroxymethyl)-1-cyclohexyl-3-(3-methylcyclohexyl)urea. |
| 259 | 1-cyclohexylmethyl-3-cyclopentylurea | 1-hydroxymethyl-1-cyclohexylmethyl-3-cyclopentylurea; 1-hydroxymethyl-1-cyclopentyl-3-cyclohexylmethylurea. | 1,3-bis(hydroxymethyl)-1-cyclohexylmethyl-3-cyclopentylurea. |
| 260 | 1-(2-chlorocyclohexyl)-3-cyclooctylurea | 1-hydroxymethyl-1-(2-chlorocyclohexyl)-3-cyclooctylurea; 1-hydroxymethyl-1-cyclooctyl-3-(2-chlorocyclooctyl)urea. | 1,3-bis(hydroxymethyl)-1-(2-chlorocyclohexyl)-3-cyclooctylurea. |
| 261 | 1-(2-methylcyclohexyl)-3-(2-fluorocyclohexyl)urea | 1-hydroxymethyl-1-(2-methylcyclohexyl)-3-(2-fluorocyclohexyl)urea; 1-hydroxymethyl-1-(2-fluorocyclohexyl)-3-(2-methylcyclohexyl)urea. | 1,3-bis(hydroxymethyl)-1-(2-methylcyclohexyl)-3-(2-fluorocyclohexyl)urea. |
| 262 | 1-cyclohexyl-3-(2-iodocyclohexyl)urea | 1-hydroxymethyl-1-cyclohexyl-3-(2-iodocyclohexyl)urea; 1-hydroxymethyl-1-(2-iodocyclohexyl)-3-cyclohexylurea. | 1,3-bis(hydroxymethyl)-1-cyclohexyl-3-(2-iodocyclohexyl)urea. |
| 263 | 1-cyclohexyl-3-cyclohexen-2-ylurea | 1-hydroxymethyl-1-cyclohexyl-3-cyclohexen-2-ylurea; 1-hydroxymethyl-1-cyclohexen-2-yl-3-cyclohexylurea. | 1,3-bis(hydroxymethyl)-1-cyclohexyl-3-cyclohexen-2-ylurea. |
| 264 | 1-cycloocten-2-yl-3-cyclopenten-2-ylurea | 1-hydroxymethyl-1-cycloocten-2-yl-3-cyclopenten-2-ylurea; 1-hydroxymethyl-1-cyclopenten-2-yl-3-cycloocten-2-ylurea. | 1,3-bis(hydroxymethyl)-1-cycloocten-2-yl-3-cyclopenten-2-ylurea. |

EXAMPLE 265

1,3-bis[hydroxypoly(methoxy)methyl]-1-cyclohexyl-3-(cyclohexylmethyl)urea

A mixture consisting of 10 parts by weight of 1-cyclohexyl-3-(cyclohexylmethyl)urea, 3 parts by weight of barium hydroxide octa hydrate, 500 parts by weight of 37% aqueous formaldehyde and 500 parts by weight of dioxane are refluxed for 1.5 hours. To the cooled mixture is added 300 parts by weight of water. The mixture is then filtered and the filtrate extracted three times with 300 ml. methylene chloride. The organic extracts are combined and washed with 200 parts by weight of water and then dried. Evaporation of the solvent yields 1,3-bis-[hydroxypoly(methoxy)methyl] - 1 - cyclohexyl-3-(cyclohexylmethyl)urea as a colorless viscous oil.

The following wettable powder can be diluted with water and applied as a post-emergence spray or it can be made up as a tank mix in conjunction with 0.2–5 parts of trimethylnonyl polyethylene glycol ether per part of active ingredient:

| | Percent |
| --- | --- |
| 1,3 - bis[hydroxypoly(methoxy)methyl]-1-cyclohexyl-3-(cyclohexymethyl)urea | 24 |
| Montmorillonite clay | 73 |
| Dioctyl sodium sulfosuccinate | 2 |
| Partially desulfonated sodium lignin sulfonate | 1 |

This wettable powder formulation is applied at the rate of 5 to 8 pounds of active ingredient in conjunction with 4 pounds of surfactant in 40 gallons of water as a directed post-emergence spray to crabgrass and barnyard grass in the 1- to 3-leaf stage in a field of cotton when the cotton is 6 inches high. Excellent retardation of growth of the barnyard grass is obtained. Late germinating seedlings are retarded severely. Upon examination of the weeds, a severe retardation of the root system is noted. The cotton shows normal growth.

EXAMPLES 266–292

The following products are prepared in the manner of the 1,3-bis[hydroxypoly(methoxy)methyl]-1-cyclohexyl-3-(cyclohexylmethyl)urea of Example 265 by substituting for the 1-cyclohexyl-3-(cyclohexylmethyl)-urea of Example 265 a like amount by weight of the following ureas.

The products are each formulated and applied in like manner as the products of Example 265 to provide like results.

| | Urea | Product |
|---|---|---|
| 266 | 1-(2-methylcyclohexyl)-3-cyclohexylurea | 1,3-bis[hydroxypoly(methoxy)-methyl]-1-(2-methylcyclohexyl)-3-cyclohexylurea. |
| 267 | 1-cyclohexyl-3-cyclooctylurea | 1,3-bis[hydroxypoly(methoxy)-methyl]-1-cyclohexyl-3-cyclooctylurea. |
| 268 | 1-(2-chlorocyclohexyl)-3-cyclohexylurea | 1,3-bis[hydroxypoly(methoxy)-methyl]-1-(2-chlorocyclohexyl)-3-cyclohexylurea. |
| 269 | 1-(2-bromocyclohexyl)-3-cyclopentylurea | 1,3-bis[hydroxypoly(methoxy)-methyl]-1-(2-bromocyclohexyl)-3-cyclopentylurea. |
| 270 | 1-(3-bromocyclohexyl)-3-cycloheptylurea | 1,3-bis[hydroxypoly(methoxy)-methyl]-1-(3-bromocyclohexyl)-3-cycloheptylurea. |
| 271 | 1-(dichlorocyclohexyl)-3-cyclooctylurea | 1,3-bis[hydroxypoly(methoxy)-methyl]-1-(dichlorocyclohexyl)-3-cyclooctylurea. |
| 272 | 1-(2-iodocyclohexyl)-3-(2-methylcyclohexyl)urea | 1,3-bis[hydroxypoly(methoxy)-1-(2-iodocyclohexyl)-3-(2-methylcyclohexyl)urea. |
| 273 | 1-cyclohexyl-3-cycloheptylurea | 1,3-bis[hydroxypoly(methoxy)-methyl]-1-cyclohexyl-3-cycloheptylurea. |
| 274 | 1-(2-norbornylmethyl)-3-cyclohexylurea | 1,3-bis[hydroxypoly(methoxy)-methyl]-1-(2-norbornylmethyl)-3-cyclohexylurea. |
| 275 | 1-(bicyclooctyl)-3-cyclohexylurea | 1,3-bis[hydroxypoly(methoxy)-methyl]-1-(bicyclooctyl)-3-cyclohexylurea. |
| 276 | 1-cyclopentyl-3-(2-methylcyclohexyl)urea | 1,3-bis[hydroxypoly(methoxy)-methyl]-1-cyclopentyl-3-(2-methylcyclohexyl)urea. |
| 277 | 1-(2-methylcyclopentyl)-3-cyclohexylurea | 1,3-bis[hydroxypoly(methoxy)-methyl]-1-(2-methylcyclopentyl)-3-cyclohexylurea. |
| 278 | 1-(chlorocyclopentyl)-3-cycloheptylurea | 1,3-bis[hydroxypoly(methoxy)-methyl]-1-(chlorocyclopentyl)-3-cycloheptylurea. |
| 279 | 1-cyclohexyl-3-cyclohepten-2-ylurea | 1,3-bis[hydroxypoly(methoxy)-methyl]-1-cyclohexyl-3-cyclohepten-2-ylurea. |
| 280 | 1-(bromocyclopentyl)-3-cyclopentylurea | 1,3-bis[hydroxypoly(methoxy)-methyl]-1-(bromocyclopentyl)-3-cyclopentylurea. |
| 281 | 1-(cyclohexylmethyl)-3-cycloheptylurea | 1,3-bis[hydroxypoly(methoxy)-methyl]-1-cyclohexylmethyl-3-cycloheptylurea. |
| 282 | 1-cycloheptyl-3-(3-methylcyclohexyl)urea | 1,3-bis[hydroxypoly(methoxy)-methyl]-1-cycloheptyl-3-(3-methylcyclohexyl)urea. |
| 283 | 1-cyclopentyl-3-cyclooctylurea | 1,3-bis[hydroxypoly(methoxy)-methyl]-1-cyclopentyl-3-cyclooctylurea. |
| 284 | 1-(2-methylcyclopentyl)-3-cyclopentylurea | 1,3-bis[hydroxypoly(methoxy)-methyl]-1-(2-methylcyclopentyl)-3-cyclopentylurea. |
| 285 | 1-(2-methylcyclohexyl)-3-cyclopentylurea | 1,3-bis[hydroxypoly(methoxy)-(2-methylcyclohexyl)-3-cyclopentylurea. |
| 286 | 1-(3-methylcyclohexyl)-3-cyclopentylurea | 1,3-bis[hydroxypoly(methoxy)-methyl]-1-(3-methylcyclohexyl)-3-cyclopentylurea. |
| 287 | 1-(2-methylcyclohexen-2-yl)-3-cycloocten-3-ylurea | 1,3-bis[hydroxypoly(methoxy)-methyl]-1-(2-methylcyclohexen-2-yl)-3-cycloocten-3-ylurea. |
| 288 | 1-cyclohexyl-3-(3-methylcyclohexyl)urea | 1,3-bis[hydroxypoly(methoxy)-methyl]-1-cyclohexyl-3-(3-methylcyclohexyl)urea. |
| 289 | 1-cyclohexylmethyl-3-cyclopentylurea | 1,3-bis[hydroxypoly(methoxy)-methyl]-1-cyclohexylmethyl-3-cyclopentylurea. |
| 290 | 1-(2-chlorocyclohexyl)-3-cyclooctylurea | 1,3-bis[hydroxypoly(methoxy)-methyl]-1-(2-chlorocyclohexyl)-3-cyclooctylurea. |
| 291 | 1-(2-methylcyclohexyl)-3-(2-fluorocyclohexyl)urea | 1,3-bis[hydroxypoly(methoxy)-methyl]-1-(2-methylcyclohexyl)-3-(2-fluorocyclohexyl)urea. |
| 292 | 1-cyclohexyl-3-(2-iodocyclohexyl)urea | 1,3-bis[hydroxypoly(methoxy)-methyl]-1-cyclohexyl-3-(2-iodocyclohexyl)urea. |

EXAMPLE 293

Mixture of 1-methoxymethyl-1-cyclohexyl-3-(cyclohexylmethyl)urea and 1-methoxymethyl-1-(cyclohexylmethyl)-3-cyclohexylurea A solution consisting of 100 parts by weight of 1,3-bis-(hydroxymethyl) - 1-(2methylcyclohexyl)-3-cyclohexylurea, 1 part by weight of concentrated hydrochloric acid, and 300 parts by weight of methanol are stirred, at a temperature not exceeding 65° C., for several hours. Evaporation of the solution yields an oil consisting essentially of a mixture of 1-(methoxymethyl)-1-cyclohexyl-3-cyclohexylmethyl-urea and 1-methoxymethyl - 1 - (cyclohexylmethyl) - 3 - cyclohexyl-urea. Trace amounts of 1,3 - bis-(methoxymethyl) - 1 - cyclohexyl - 3-(cyclohexylmethyl) urea are also present.

The following composition is prepared by blending the ingredients and wet milling in a ball mill to obtain a uniform dispersion with a particle size less than 20 microns.

|  | Percent |
|---|---|
| Mixture of 1-methoxymethyl-1-cyclo-hexylmethyl-3-cyclohexylurea and 1-methoxymethyl-1-cyclohexyl-3-(cyclohexylmethyl)urea | 25 |
| Aromatic herbicidal oil | 75 |

This formulation may be extended with diesel oil. It has utility for the control of Johnson grass seedlings in the 1 to 3 leaf stage as a directed post-emergence application of 3 to 8 pounds of active ingredient per acre in 20 gallons of diesel oil. It provides excellent control of Johnson grass growing in fields of cotton and sugar cane and retards the development of subsequently germinating Johnson grass.

EXAMPLES 294–328

The following products are prepared in the manner of the mixture of 1-methoxymethyl-1-cyclohexyl-3-(cyclohexylmethyl)urea and 1-methoxymethyl-1-(cyclohexylmethyl)-3-cyclohexylurea of Example 293 by substituting for the mixture of 1-hydroxymethyl-1-cyclohexyl-3-cyclohexylmethylurea and 1-hydroxymethyl-1-cyclohexylmethyl-3-cyclohexylurea and methyl alcohol of Example 293 a like amount by weight of the following hydroxyureas and alcohols or mercaptan.

The products are formulated and applied in like manner as the products of Example 293 to provide like results.

| | Urea | Alcohol | Major Products | Minor Products |
|---|---|---|---|---|
| 294 | 1,3-bis-(hydroxymethyl)-1-(2-methylcyclohexyl)-3-cyclohexylurea. | Ethyl alcohol | 1-(ethoxymethyl)-1-(2-methylcyclohexyl)-3-cyclohexylurea; 1-(ethoxymethyl)-1-cyclohexyl-3-(2-methylcyclohexyl)urea. | 1,3-bis(ethoxymethyl)-1-(2-methylcyclohexyl)-3-cyclohexylurea. |
| 295 | 1,3-bis(hydroxymethyl)-1-cyclohexyl-3-cyclooctylurea. | Methyl alcohol | 1-(methoxymethyl)-1-cyclohexyl-3-cyclooctylurea; 1-(methoxymethyl)-1-cyclooctyl-3-cyclohexylurea. | 1,3-bis(methoxymethyl)-1-cyclohexyl-3-cyclooctylurea. |
| 296 | 1,3-bis(hydroxymethyl)-1-(2-methylcyclohexyl)-3-cyclohexylurea. | Ethyl alcohol | 1-(ethoxymethyl)-1-(2-methylcyclohexyl)-3-cyclohexylurea; 1-(ethoxyethyl)-1-cyclohexyl-3-(2-methylcyclohexyl)urea. | 1,3-bis(ethoxymethyl)-1-(2-methylcyclohexyl)-3-cyclohexylurea. |
| 297 | 1,3-bis(hydroxymethyl)-1-cyclohexyl-3-(cyclohexyl)urea. | isopropyl alcohol | 1-(iso-propoxymethyl)-1-cyclohexyl-3-(cyclohexylmethyl)urea; 1-(iso-propoxymethyl)-1-cyclohexylmethyl-3-cyclohexylurea. | 1,3-bis(iso-propoxymethyl)-1-cyclohexyl-3-(cyclohexylmethyl)urea. |
| 298 | 1,3-bis(hydroxymethyl)-1-(2-chlorocyclohexyl)-3-cyclohexylurea. | Methyl alcohol | 1-(methoxymethyl)-1-(2-chlorocyclohexyl)-3-cyclohexylurea; 1-(methoxymethyl)-1-cyclohexyl-3-(2-chlorocyclohexyl)urea. | 1,3-bis(methoxymethyl)-1-(2-chlorocyclohexyl)-3-cyclohexylurea. |
| 299 | 1,3-bis(hydroxymethyl)-1-(2-bromocyclohexyl)-3-cyclopentylurea. | do | 1-(methoxymethyl)-1-(2-bromocyclohexyl)-3-cyclopentylurea; 1-(methoxymethyl)-1-cyclopentyl-3-(2-bromocyclohexyl)urea. | 1,3-bis(methoxymethyl)-1-(2-bromocyclohexyl)-3-cyclopentylurea. |
| 300 | 1,3-bis(hydroxymethyl)-1-(3-bromocyclohexyl)-3-cycloheptylurea. | do | 1-(methoxymethyl)-1-(3-bromocyclohexyl)-3-cycloheptylurea; (1-(methoxymethyl)-1-cycloheptyl-3-(3-bromocyclohexyl)urea. | 1,3-bis(methoxymethyl)-1-(3-bromocyclohexyl)-3-cycloheptylurea. |
| 301 | 1,3-bis(hydroxymethyl)-1-cyclohexyl-3-cycloheptylurea. | n-Butyl alcohol | 1-(n-butoxymethyl)-1-cyclohexyl-3-cycloheptylurea; 1-(n-butoxymethyl)-1-cycloheptyl-3-cyclohexylurea. | 1,3-bis(n-butoxymethyl)-1-cyclohexyl-3-cycloheptylurea. |

| | Urea | Alcohol | Major Products | Minor Products |
|---|---|---|---|---|
| 302 | 1,3-bis(hydroxymethyl)-1-(dichlorocyclohexyl)-3-cyclooctylurea. | Methyl alcohol | 1-(methoxymethyl)-1-(dichlorocyclohexyl)-3-cyclooctylurea; 1-(methoxymethyl)-1-cyclooctyl-3-(dichlorocyclohexyl)urea. | 1,3-bis(methoxymethyl)-1-(dichlorocyclohexyl)-3-cyclooctylurea. |
| 303 | 1,3-bis(hydroxymethyl)-1-cyclohexyl-3-(2-methylcyclopentyl)urea. | Ethyl alcohol | 1-(ethoxymethyl)-1-cyclohexyl-3-(2-methylcyclopentyl)urea; 1-(ethoxymethyl)-1-(2-methylcyclopentyl)-3-cyclohexylurea. | 1,3-bis(ethoxymethyl)-1-cyclohexyl-3-(2-methylcyclopentyl)urea. |
| 304 | 1,3-bis(hydroxymethyl)-1-(2-iodocyclohexyl)-3-(2-methylcyclohexyl)urea. | Methyl alcohol | 1-(methoxymethyl)-1-(2-iodocyclohexyl)-3-(2-methylcyclohexyl)urea; 1-(methoxymethyl)-1-(2-methylcyclohexyl)-3-(2-iodocyclohexyl)urea. | 1,3-bis(methoxymethyl)1-(2-iodocyclohexyl)-3-(2-methylcyclohexyl)urea. |
| 305 | 1,3-bis(hydroxymethyl)-1-cyclohexyl-3-cycloheptylurea. | ___do___ | 1-(methoxymethyl)-1-cyclohexyl-3-cycloheptylurea; 1-(methoxymethyl)-1-cycloheptyl-3-cyclohexylurea. | 1,3-bis(methoxymethyl)-1-cyclohexyl-3-cycloheptylurea. |
| 306 | 1,3-bis(hydroxymethyl)-1-(2-norbornylmethyl)-3-cyclohexylurea. | ___do___ | 1-(methoxymethyl)-1-(2-norbornylmethyl)-3-cyclohexylurea; 1-(methoxymethyl)-1-cyclohexyl-3-(2-norbornylmethyl)urea. | 1,3-bis(methoxymethyl)-1-(2-norbornylmethyl)-3-cyclohexylurea. |
| 307 | 1,3-bis(hydroxymethyl)-1-decahydrobenzyl-3-cycloheptylurea. | Ethyl alcohol | 1-(ethoxymethyl)-1-decahydrobenzyl-3-cycloheptylurea; 1-(ethoxymethyl)-1-cycloheptyl-3-decahydrobenzylurea. | 1,3-bis(ethoxymethyl)-1-decahydrobenzyl-3-cycloheptylurea. |
| 308 | 1,3-bis(hydroxymethyl)-1-(bicyclooctyl)-3-cyclohexylurea. | Methyl alcohol | 1-(methoxymethyl)-1-(bicyclooctyl)-3-cyclohexylurea; 1-(methoxymethyl)-1-cyclohexyl-3-(bicyclooctyl)urea. | 1,3-bis(methoxymethyl)-1-(bicyclooctyl)-3-cyclohexylurea. |
| 309 | 1,3-bis(hydroxymethyl)-1-cyclopentyl-3-(2-methylcyclohexyl)urea. | ___do___ | 1-(methoxymethyl)-1-cyclopentyl-3-(2-methycyclohexyl)urea; 1-(methoxymethyl)-1-(2-methylcyclohexyl)-3-cyclopentylurea. | 1,3-bis(methoxymethyl)-1-cyclopentyl-3-(2-methylcyclohexyl)urea. |
| 310 | 1,3-bis(hydroxymethyl)-1-(2-methylcyclopentyl)-3-cyclohexylurea. | ___do___ | 1-(methoxymethyl)-1-(2-methylcyclopentyl)-3-cyclohexylurea; 1-(methoxymethyl)-1-cyclohexyl-3-(2-methylcyclopentyl)urea. | 1,3-bis(methoxymethyl)-1-(2-methylcyclopentyl)-3-cyclohexylurea. |
| 311 | 1,3-bis(hydroxymethyl)-1-(chlorocyclopentyl)-3-cycloheptylurea. | ___do___ | 1-(methoxymethyl)-1-(chlorocyclopentyl)-3-cycloheptylurea; 1-(methoxymethyl)-1-cycloheptyl-3-(chlorocyclopentyl)urea. | 1,3-bis(methoxymethyl)-1-(chlorocyclopentyl)-3-cycloheptylurea. |
| 312 | 1,3-bis(hydroxymethyl)-1-(dichlorocyclopentyl)-3-cyclooctylurea. | ___do___ | 1-(methoxymethyl)-1-(dichlorocyclopentyl)-3-cyclooctylurea; 1-(methoxymethyl)-1-cyclooctyl-3-(dichlorocyclopentyl)urea. | 1,3-bis(methoxymethyl)-1-(dichlorocyclopentyl)-3-cyclooctylurea. |
| 313 | 1,3-bis(hydroxymethyl)-1-cyclopentyl-3-cyclooctylurea. | sec-Butyl alcohol | 1-(sec-butoxymethyl)-1-cyclopentyl-3-cyclooctylurea; 1-(sec-butoxymethyl)-1-cyclooctyl-3-cyclopentylurea. | 1,3-bis(sec-butoxymethyl)-1-cyclopentyl-3-cyclooctylurea. |
| 314 | 1,3-bis(hydroxymethyl)-1-(bromocyclopentyl)-3-cyclopentylurea. | Methyl alcohol | 1-(methoxymethyl)-1-(bromocyclopentyl)-3-cyclopentylurea; 1-(methoxymethyl)-1-cyclopentyl-3-(bromocyclopentyl)urea. | 1,3-bis(methoxymethyl)-1-(bromocyclopentyl)-3-cyclopentylurea. |
| 315 | 1,3-bis(hydroxymethyl)-1-cyclohexylmethyl-3-cycloheptylurea. | ___do___ | 1-(methoxymethyl)-1-cyclohexylmethyl-3-cycloheptylurea; 1-methoxymethyl)-1-cycloheptyl-3-cyclohexylmethylurea. | 1,3-bis(methoxymethyl)-1-cyclohexylmethyl-3-cycloheptylurea. |
| 316 | 1,3-bis(hydroxymethyl)-1-cycloheptyl-3-(3-methylcyclohexyl)urea. | ___do___ | 1-(methoxymethyl)-1-cycloheptyl-3-(3-methylcyclohexyl)urea; 1-(methoxymethyl)-1-(3-methylcyclohexyl)-3-cycloheptylurea. | 1,3-bis(methoxymethyl)-1-cycloheptyl-3-(3-methylcyclohexyl)urea. |
| 317 | 1,3-bis(hydroxymethyl)-1-cyclopentyl-3-cyclooctylurea. | ___do___ | 1-(methoxymethyl)-1-cyclopentyl-3-cyclooctylurea; 1-(methoxymethyl)-1-cyclooctyl-3-cyclopentylurea. | 1,3-bis(methoxymethyl)-1-cyclopentyl-3-cyclooctylurea. |
| 318 | 1,3-bis(hydroxymethyl)-1-(2-methylcyclopentyl)-3-cyclopentylurea. | ___do___ | 1-(methoxymethyl)-1-(2-methylcyclopentyl)-3-cyclopentylurea; 1-(methoxymethyl)-1-cyclopentyl-3-(2-methylcyclopentyl)urea. | 1,3-bis(methoxymethyl)-1-(2-methylcyclopentyl)-3-cyclopentylurea. |
| 319 | 1,3-bis(hydroxymethyl)-1-(2-methylcyclohexyl)-3-cyclopentylurea. | ___do___ | 1-(methoxymethyl)-1-(2-methylcyclohexyl)-3-cyclopentylurea; 1-(methoxymethyl)-1-cyclopentyl-3-(2-methylcyclohexyl)urea. | 1,3-bis(methoxymethyl)-1-(2-methylcyclohexyl)-3-cyclopentylurea. |
| 320 | 1,3-bis(hydroxymethyl)-1-(3-methylcyclohexyl)-3-cyclopentylurea. | ___do___ | 1-(methoxymethyl)-1-(3-methylcyclohexyl)-3-cyclopentylurea; 1-(methoxymethyl)-1-cyclopentyl-3-(3-methylcyclohexyl)urea. | 1,3-bis(methoxymethyl)-1-(3-methylcyclohexyl)-3-cyclopentylurea. |
| 321 | 1,3-bis(hydroxymethyl)-1-cyclohexyl-3-(1,3-dimethylcyclohexyl)urea. | ___do___ | 1-(methoxymethyl)-1-cyclohexyl-3-(1,3-dimethylcyclohexyl)urea; 1-(methoxymethyl)-1-(1,3-dimethylcyclohexyl)-3-cyclohexylurea. | 1,3-bis(methoxymethyl)-1-cyclohexyl-3-(1,3-dimethylcyclohexyl)urea. |
| 322 | 1,3-bis(hydroxymethyl)-1-cyclohexyl-3-(3-methylcyclohexyl)urea. | ___do___ | 1-(methoxymethyl)-1-cyclohexyl-3-(3-methylcyclohexyl)urea; 1-(methoxymethyl)-1-(3-methylcyclohexyl)-3-cyclohexylurea. | 1,3-bis(methoxymethyl)-1-cyclohexyl-3-(3-methylcyclohexyl)urea. |

| Urea | Alcohol or Mercaptan | Major Products | Minor Products |
|---|---|---|---|
| 323. 1,3-bis(hydroxymethyl)-1-cyclohexyl-methyl-3-cyclopentylurea. | Methyl alcohol | 1-(methoxymethyl)-1-cyclohexyl-methyl-3-cyclopentylurea; 1-(methoxymethyl)-1-cyclopentyl-3-(cyclohexylmethyl)urea. | 1,3-bis(methoxymethyl)-1-cyclohexyl-methyl-3-cyclopentylurea. |
| 324. 1,3-bis(hydroxymethyl)-1-(chlorocyclopentyl)-3-cycloheptylurea. | Ethyl alcohol | 1-(ethoxymethyl)-1-(chlorocyclopentyl)-3-cycloheptylurea; 1-(ethoxymethyl)-1-cycloheptyl-3-(chlorocyclopentyl)urea. | 1,3-bis(ethoxymethyl)-1-(chlorocyclopentyl)-3-cycloheptylurea. |
| 325. 1,3-bis(hydroxymethyl)-1-(2-chlorocyclohexyl)-3-cyclooctylurea. | Methyl alcohol | 1-methoxymethyl-1-(2-chlorocyclohexyl)-3-cyclooctylurea; 1-methoxymethyl-1-cyclooctyl-3-(2-chlorocycloheptyl)urea. | 1,3-bis(methoxymethyl)-1-cyclooctyl-3-(2-chlorocyclohexyl)urea. |
| 326. 1,3-bis(hydroxymethyl)-1-cyclohexyl-3-(2-iodocyclohexyl)urea. | ...do... | 1-methoxymethyl-1-cyclohexyl-3-(2-iodocyclohexyl)urea; 1-methoxymethyl-1-(2-iodocyclohexyl)-3-cyclohexylurea. | 1,3-bis(methoxymethyl)-1-cyclohexyl-3-(2-iodocyclohexyl)urea. |
| 327. 1,3-bis(hydroxymethyl)-1-cyclohexen-2-yl-3-cyclohexylurea. | ...do... | 1-(methoxymethyl)-1-cyclohexen-2-yl-3-cyclohexylurea; 1-(methoxymethyl)-1-cyclohexyl-3-cyclohexen-2-ylurea. | 1,3-bis(methoxymethyl)-1-cyclohexen-2-yl-3-cyclohexylurea. |
| 328. 1,3-bis(hydroxymethyl)-1-cyclopenten-2-yl-3-cyclohexen-3-ylurea. | ...do... | 1-(methoxymethyl)-1-cyclopenten-2-yl-3-cyclohexen-3-ylurea; 1-(methoxymethyl)-1-cyclohexen-3-yl-3-cyclopenten-2-ylurea. | 1,3-bis(methoxymethyl)-1-cyclopenten-2-yl-3-cyclohexen-3-ylurea. |
| 329. 1,3-bis(hydroxymethyl)-1-cyclohexyl-methyl-3-cycloheptylurea. | Methyl mercaptan | 1-(methylthiomethyl)-1-cyclohexyl-methyl-3-cycloheptylurea; 1-(methylthiomethyl)-1-cycloheptyl-3-cyclohexylmethylurea. | 1,3-bis(methylthiomethyl)-1-cyclohexylmethyl-3-cycloheptylurea. |
| 330. 1,3-bis(hydroxymethyl)-1-cyclohexyl-3-cyclooctylurea. | ...do... | 1-(methylthiomethyl)-1-cyclohexyl-3-cyclooctylurea; 1-(methylthiomethyl)-1-cyclooctyl-3-cyclohexylurea. | 1,3-bis(methylthiomethyl)-1-cyclohexyl-3-cyclooctylurea. |
| 331. 1,3-bis(hydroxymethyl)-1-cyclohexyl-3-cycloheptylurea. | n-Butyl mercaptan | 1-(n-butylthiomethyl)-1-cyclohexyl-3-cycloheptylurea; 1-(n-butylthiomethyl)-1-cycloheptyl-3-cyclohexylurea. | 1,3-bis(n-butylthiomethyl)-1-cyclohexyl-3-cycloheptylurea. |

EXAMPLE 332

1,3-bis(methoxymethyl)-1-cyclohexyl-3-(cyclohexylmethyl)urea

A solution consisting of 100 parts by weight of 1,3-bis(hydroxymethyl)-1-cyclohexyl - 3 - hexahydrobenzylurea, 1 part by weight concentrated hydrochloric acid, 300 parts by weight of methanol is stirred, at a temperature not exceeding 35° C. for several hours. Evaporation of the solution yields an oil containing 1,3-bis(methoxymethyl)-1-cyclohexyl - 3 - (cyclohexylmethyl)urea as the main product, and smaller amounts of 1-(methoxymethyl)-1-cyclohexyl - 3 - (cyclohexylmethyl)urea and 1-(methoxymethyl)-1-cyclohexylmethyl-3-cyclohexylurea.

|   | Percent |
|---|---|
| 1,3-bis(methoxymethyl)-1-cyclohexyl-3-(cyclohexylmethyl)urea | 22.6 |
| Pikes Peak clay | 74.4 |
| Aerosol OT-B Na, dioctyl sulfosuccinate | 1.5 |
| Na, lignin sulfonate | 1.5 |

The above components are blended and micropulverized until homogeneous and then reblended.

The formulation described above is applied preemergence at the rate of 3 to 8 pounds of active ingredient per acre in 40 gallons of water for the control of foxtails, crabgrass and barnyard grass in a wide variety of economic crops. Excellent retardation of these weeds is obtained without significant injury to cucumbers, potatoes, tomatoes, squash, eggplant, peppers, red beets, carrots, okra, cotton, flax, lima beans, lespedeza, soybeans, alfalfa, green beans, peanuts, wheat and rice.

EXAMPLES 333–363

The following products are prepared in the manner of the 1,3 - bis(methoxymethyl) - 1 - cyclohexyl-3-(cyclohexylmethyl)urea of Example 332 by substituting for the 1,3 - bis(hydroxymethyl) - 1 - cyclohexyl-3-hexahydrobenzylurea and methyl alcohol of Example 332 a like amount by weight of the following hydroxyureas and alcohols or mercaptans.

The products are formulated and applied in like manner as the products of Example 332 to provide like results.

| Urea | Alcohol | Major Product | Minor Products |
|---|---|---|---|
| 333. 1,3-bis(hydroxymethyl)-1-(2-methylcyclohexyl)-3-cyclohexylurea. | Methyl alcohol | 1,3-bis(methoxymethyl)-1-(2-methylcyclohexyl)-3-cyclohexylurea. | 1-(methoxymethyl)-1-(2-methylcyclohexyl)-3-cyclohexylurea; 1-(methoxymethyl)-1-cyclohexyl-3-(2-methylcyclohexyl)urea. |
| 334. 1,3-bis(hydroxymethyl)-1-cyclohexyl-3-cyclooctylurea. | ...do... | 1,3-bis(methoxymethyl)-1-cyclohexyl-3-cyclooctylurea. | 1-(methoxymethyl)-1-cyclohexyl-3-cyclooctylurea; 1-(methoxymethyl)-1-cyclooctyl-3-cyclohexylurea. |
| 335. 1,3-bis(hydroxymethyl)-1-(2-methylcyclohexyl)-3-cyclohexylurea. | Ethyl alcohol | 1,3-bis(ethoxymethyl)-1-(2-methylcyclohexyl)-3-cyclohexylurea. | 1-(ethoxymethyl)-1-(2-methylcyclohexyl)-3-cyclohexylurea; 1-(ethoxyethyl)-1-cyclohexyl-3-(2-methylcyclohexyl)urea. |
| 336. 1,3-bis(hydroxymethyl)-1-cyclohexyl-3-(cyclohexylmethyl)urea. | iso-Propyl alcohol | 1,3-bis(iso-propoxymethyl)-1-cyclohexyl-3-(cyclohexylmethyl)urea. | 1-(iso-propoxymethyl)-1-cyclohexyl-3-cyclohexylmethylurea; 1-(iso-propoxymethyl)-1-cyclohexylmethyl-3-cyclohexylurea. |

| | Urea | Alcohol | Major Product | Minor Products |
|---|---|---|---|---|
| 337 | 1,3-bis(hydroxymethyl)-1-(2-chlorocyclohexyl)-3-cyclohexylurea. | Methyl alcohol | 1,3-bis(methoxymethyl)-1-(2-chlorocyclohexyl)-3-cyclohexylurea. | 1-(methoxymethyl)-1-(2-chlorocyclohexyl)-3-cyclohexylurea; 1-(methoxymethyl)-1-cyclohexyl-3-(2-chlorocyclohexyl)urea. |
| 338 | 1,3-bis(hydroxymethyl)-1-(2-bromocyclohexyl)-3-cyclopentylurea. | ......do...... | 1,3-bis(methoxymethyl)-1-(2-bromocyclohexyl)-3-cyclopentylurea. | 1-(methoxymethyl)-1-(2-bromocyclohexyl)-3-cyclohexylurea; 1-(methoxymethyl)-1-cyclohexyl-3-(2-bromocyclohexyl)urea. |
| 339 | 1,3-bis(hydroxymethyl)-1-(3-bromocyclohexyl)-3-cycloheptylurea. | ......do...... | 1,3-bis(methoxymethyl)-1-(3-bromocyclohexyl)-3-cycloheptylurea. | 1-(methoxymethyl)-1-(3-bromocyclohexyl)-3-cycloheptylurea; 1-(methoxymethyl)-1-cycloheptyl-3-(3-bromocyclohexyl)urea. |
| 340 | 1,3-bis(hydroxymethyl)-1-cyclohexyl-3-cycloheptylurea. | n-Butyl alcohol | 1,3-bis(n-butoxymethyl)-1-cyclohexyl-3-cycloheptylurea. | 1-(n-butoxymethyl)-1-cyclohexyl-3-cycloheptylurea; 1-(n-butoxymethyl)-1-cycloheptyl-3-cyclohexylurea. |
| 341 | 1,3-bis(hydroxymethyl)-1-(dichlorocyclohexyl)-3-cyclooctylurea. | Methyl alcohol | 1,3-bis(methoxymethyl)-1-(dichlorocyclohexyl)-3-cyclooctylurea. | 1-(methoxymethyl)-1-(dichlorocyclohexyl)-3-cyclooctylurea; 1-(methoxymethyl)-1-cyclooctyl-3-(dichlorocyclohexyl)urea. |
| 342 | 1,3-bis(hydroxymethyl)-1-cyclohexyl-3-(2-methylcyclopentyl)urea. | Ethyl alcohol | 1,3-bis(ethoxymethyl)-1-cyclohexyl-3-(2-methylcyclopentyl)urea. | 1-(ethoxymethyl)-1-cyclohexyl-3-(2-methylcyclopentyl)urea; 1-(ethoxymethyl)-1-(2-methylcyclopentyl)-3-cyclohexylurea. |
| 343 | 1,3-bis(hydroxymethyl)-1-(2-iodocyclohexyl)-3-(2-methylcyclohexyl)urea. | Methyl alcohol | 1,3-bis(methoxymethyl)-1-(2-iodocyclohexyl)-3-(2-methylcyclohexyl)urea. | 1-(methoxymethyl)-1-(2-iodocyclohexyl)-3-(2-methylcyclohexyl)urea; 1-(methoxymethyl)-1-cycloheptyl-3-cyclohexylurea. |
| 344 | 1,3-bis(hydroxymethyl)-1-cyclohexyl-3-cycloheptylurea. | ......do...... | 1,3-bis(methoxymethyl)-1-cyclohexyl-3-cycloheptylurea. | 1-(methoxymethyl)-1-cyclohexyl-3-cycloheptylurea; 1-(methoxymethyl)-1-cycloheptyl-3-cyclohexylurea. |
| 345 | 1,3-bis(hydroxymethyl)-1-(2-norbornylmethyl)-3-cyclohexylurea. | ......do...... | 1,3-bis(methoxymethyl)-1-(2-norbornylmethyl)-3-cyclohexylurea. | 1-(methoxymethyl)-1-(2-norbornylmethyl)-3-cyclohexylurea; 1-(methoxymethyl)-1-cyclohexyl-3-(2-norbornylmethyl)urea. |
| 346 | 1,3-bis(hydroxymethyl)-1-hexahydrobenzyl-3-cycloheptylurea. | Ethyl alcohol | 1,3-bis(ethoxymethyl)-1-hexahydrobenzyl-3-cycloheptylurea. | 1-(ethoxymethyl)-1-hexahydrobenzyl-3-cycloheptylurea; 1-(ethoxymethyl)-1-cycloheptyl-3-hexahydrobenzylurea. |
| 347 | 1,3-bis(hydroxymethyl)-1-(bicyclooctyl)-3-cyclohexylurea. | Methyl alcohol | 1,3-bis(methoxymethyl)-1-(bicyclooctyl)-3-cyclohexylurea. | 1-(methoxymethyl)-1-(bicyclooctyl)-3-cyclohexylurea; 1-(methoxymethyl)-1-cyclohexyl-3-(bicyclooctyl)urea. |
| 348 | 1,3-bis(hydroxymethyl)-1-cyclopentyl-3-(2-methylcyclohexyl)urea. | ......do...... | 1,3-bis(methoxymethyl)-1-cyclopentyl-3-(2-methylcyclohexyl)urea. | 1-(methoxymethyl)-1-cyclopentyl-3-(2-methylcyclohexyl)urea; 1-(methoxymethyl)-1-(2-methylcyclohexyl)-3-cyclopentylurea. |
| 349 | 1,3-bis(hydroxymethyl)-1-(2-methylcyclopentyl)-3-cyclohexylurea. | ......do...... | 1,3-bis(methoxymethyl)-1-(2-methylcyclopentyl)-3-cyclohexylurea. | 1-(methoxymethyl)-1-(2-methylcyclopentyl)-3-cyclohexylurea; (1-(methoxymethyl)-1-cyclohexyl-3-(2-methylcyclopentyl)urea. |
| 350 | 1,3-bis(hydroxymethyl)-1-(chlorocyclopentyl)-3-cycloheptylurea. | ......do...... | 1,3-bis(methoxymethyl)-1-(chlorocyclopentyl)-3-cycloheptylurea. | 1-(methoxymethyl)-1-(chlorocyclopentyl)-3-cycloheptylurea; 1-(methoxymethyl)-1-cycloheptyl-3-(chlorocyclopentyl)urea. |
| 351 | 1,3-bis(hydroxymethyl)-1-(dichlorocyclopentyl)-3-cyclooctylurea. | ......do...... | 1,3-bis(methoxymethyl)-1-(dichlorocyclopentyl)-3-cyclooctylurea. | 1-(methoxymethyl)-1-(dichlorocyclopentyl)-3-cyclooctylurea; 1-(methoxymethyl)-1-cyclooctyl-3-(dichlorocyclopentyl)urea. |
| 352 | 1,3-bis(hydroxymethyl)-1-cyclopentyl-3-cyclooctylurea. | sec-Butyl alcohol | 1,3-bis(sec-butoxymethyl)-1-cyclopentyl-3-cyclooctylurea. | 1-(sec-butoxymethyl)-1-cyclopentyl-3-cyclooctylurea; 1-(sec-butoxymethyl)-1-cyclooctyl-3-cyclopentylurea. |
| 353 | 1,3-bis(hydroxymethyl)-1-(bromocyclopentyl)-3-cyclopentylurea. | Methyl alcohol | 1,3-bis(methoxymethyl)-1-(bromocyclopentyl)-3-cyclopentylurea. | 1-(methoxymethyl)-1-(bromocyclopentyl)-3-cyclopentylurea; 1-(methoxymethyl)-1-cyclopentyl-3-(bromocyclopentyl)urea. |
| 354 | 1,3-bis(hydroxymethyl)-1-cyclohexylmethyl-3-cycloheptylurea. | ......do...... | 1,3-bis(methoxymethyl)-1-cyclohexylmethyl-3-cycloheptylurea. | 1-(methoxymethyl)-1-cyclohexylmethyl-3-cycloheptylurea; 1-(methoxymethyl)-1-cycloheptyl-3-cyclohexylmethylurea. |
| 355 | 1,3-bis(hydroxymethyl)-1-cycloheptyl-3-(3-methylcyclohexyl)urea. | ......do...... | 1,3-bis(methoxymethyl)-1-cycloheptyl-3-(3-methylcyclohexyl)urea. | 1-(methoxymethyl)-1-cycloheptyl-3-(3-methylcyclohexyl)urea; 1-(methoxymethyl)-1-(3-methylcyclohexyl)-3-cycloheptylurea. |
| 356 | 1,3-bis(hydroxymethyl)-1-cyclopentyl-3-cyclooctylurea. | ......do...... | 1,3-bis(methoxymethyl)-1-cyclopentyl-3-cyclooctylurea. | 1-(methoxymethyl)-1-cyclopentyl-3-cyclooctylurea; 1-(methoxymethyl)-1-cyclooctyl-3-cyclopentylurea. |
| 357 | 1,3-bis(hydroxymethyl)-1-(2-methylcyclopentyl)-3-cyclopentylurea. | ......do...... | 1,3-bis(methoxymethyl)-1-(2-methylcyclopentyl)-3-cyclopentylurea. | 1-(methoxymethyl)-1-(2-methylcyclopentyl)-3-cyclopentylurea; 1-(methoxymethyl)-1-cyclopentyl-3-(2-methylcyclopentyl)urea. |
| 358 | 1,3-bis(hydroxymethyl)-1-(2-methylcyclohexyl)-3-cyclopentylurea. | ......do...... | 1,3-bis(methoxymethyl)-1-(2-methylcyclohexyl)-3-cyclopentylurea. | 1-(methoxymethyl)-1-(2-methylcyclohexyl)-3-cyclopentylurea; 1-(methoxymethyl)-1-cyclopentyl-3-(2-methylcyclohexyl)urea. |

| Urea | Alcohol | Major Product | Minor Products |
|---|---|---|---|
| 359. 1,3-bis(hydroxymethyl)-1-(3-methyl-cyclohexyl)-3-cyclopentylurea. | ___do___ | 1,3-bis(methoxymethyl)-1-(3-methyl-cyclohexyl)-3-cyclopentylurea. | 1-(methoxymethyl)-1-(3-methylcyclo-hexyl)-3-cyclopentylurea; 1-(methoxymethyl)-1-cyclopentyl-3-(3-methylcyclohexyl)urea. |
| 360. 1,3-bis(hydroxymethyl)-1-(2-methyl-cyclohexyl)-3-cyclohexylurea. | Ethyl mercaptan | 1,3-bis(ethylthiomethyl)-1-(2-methyl-cyclohexyl)-3-cyclohexylurea. | 1-(ethylthiomethyl)-1-(2-methylcyclo-hexyl)-3-cyclohexylurea; 1-(ethyl-thiomethyl)-1-cyclohexyl-3-(2-methylcyclohexyl)urea. |
| 361. 1,3-bis(hydroxymethyl)-1-(2-bromo-cyclohexyl)-3-cyclopentylurea. | Methyl mercaptan | 1,3-bis(methylthiomethyl)-1-(2-bromocyclohexyl)-3-cyclo-pentylurea. | 1-(methylthiomethyl)-1-(2-bromo-cyclohexyl)-3-cyclohexylurea; 1-(methylthiomethyl)-1-cyclohexyl-3-(2-bromocyclohexyl)urea. |
| 362. 1,3-bis(hydroxymethyl)-1-cyclohexyl-methyl-3-cycloheptylurea. | ___do___ | 1,3-bis(methylthiomethyl)-1-cyclo-hexylmethyl-3-cycloheptylurea. | 1-(methylthiomethyl)-1-cyclohexyl-methyl-3-cycloheptylurea; 1-(methyl thiomethyl)-1-cycloheptyl-3-cyclohexylmethylurea. |
| 363. 1,3-bis(hydroxymethyl)-1-(2-methyl-cyclohexyl)-3-cyclopentylurea. | ___do___ | 1,3-bis(methylthiomethyl)-1-(2-methylcyclohexyl)-3-cyclo-pentylurea. | 1-(methylthiomethyl)-1-(2-methyl-cyclohexyl)-3-cyclopentylurea; 1-(methylthiomethyl)-1-cyclopentyl-3-(2-methylcyclohexyl)urea. |

EXAMPLE 364

1-(hydroxymethyl)-1-(2-methylcyclohexyl)-3-phenylurea, formulated as described in Example 60 is sprayed at the rate of eight pounds of active ingredient per acre on Kentucky bluegrass growing along a roadside. This treatment controls any germinating crabgrass and also provides temporary retardation of the bluegrass. As a result the bluegrass requires less frequent mowing to maintain it at an attractive height.

EXAMPLE 365

1-(hydroxymethoxymethyl)-1-(2-methylcyclohexyl)-3-phenylurea is formulated and applied in a like manner as the active compound of Example 357. It gives similar results.

EXAMPLE 366

1-(2-methylcyclohexyl)-1-(methylthiomethyl)-3-phenylurea is formulated as an emulsifiable concentrate in the manner described in Example 201. An amount of this material that contains ten pounds active ingredient is emulsified in sixty gallons of water and sprayed on a mixed turf consisting of Kentucky 31 fescue and bluegrass growing along a highway right-of-way. The application is made to the turf shortly after mowing in late April before crabgrass, foxtail and barnyard grass have germinated. The treatment retards the growth of these weed grasses. They create no problems to the competing turf grasses. This application also retards the growth of the desirable turf grasses without causing visible injury. This results in fewer mowings during the season to maintain the turf at an attractive height.

I claim:

1. A method for simultaneously retarding the growth of perennial grasses and broadleaf plants while selectively controlling the growth of annual weed grasses, said method comprising applying to the locus of said perennial grasses, broadleaf plants and annual weed grasses an effective amount of 1-hydroxymethyl-1-(2-methylcyclohexyl)-3-phenylurea.

2. A method for simultaneously retarding the growth of perennial grasses and broadleaf plants while selectively controlling the growth of annual weed grasses, said method comprising applying to the locus of said perennial grasses, broadleaf plants and annual weed grasses an effective amount of a compound of the formula

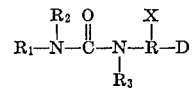

wherein
R is cyclohexyl;
X and D are independently selected from the group consisting of hydrogen, halogen, methyl and ethyl;

$R_1$ is

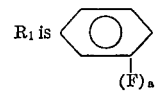

where $a$ is 0 or 1;
$R_2$ is hydrogen; and
$R_3$ is $(CH_2E)_zR_4$,
where E is oxygen or sulfur, $R_4$ is hydrogen, methyl or ethyl, $z$ is 1 or 2.

3. A method of claim 1, wherein the vegetation to which the compound is applied comprises perennial grass and annual weed grasses.

4. A method of claim 1, wherein the vegetation to which the compound is applied comprises broadleaf plants and annual weed grasses.

5. A method of claim 1, wherein the vegetation to which the compound is applied comprises perennial grasses.

6. A method of claim 1, wherein the vegetation to which the compound is applied comprises broadleaf plants.

References Cited

UNITED STATES PATENTS 3,125,601    3/1964    Goebel.
3,309,192    3/1967    Luckenbaugh.
3,347,658    10/1967    Luckenbaugh _____ 71—93X JAMES O. THOMAS, JR., Primary Examiner U.S. Cl. X.R.

71—83, 87, 92, 93, 97, 103, 112, 115, 116, 117, 118, 119